US010639592B2

(12) United States Patent
Griggs et al.

(10) Patent No.: US 10,639,592 B2
(45) Date of Patent: May 5, 2020

(54) CHITOSAN-GRAPHENE OXIDE MEMBRANES AND PROCESS OF MAKING THE SAME

(71) Applicants: BOARD OF TRUSTEES OF THE UNIVERSITY OF ARKANSAS, Little Rock, AR (US); THE UNITED STATES OF AMERICA, AS REPRESENTED BY THE SECRETARY OF THE ARMY, Alexandria, VA (US)

(72) Inventors: Christopher S. Griggs, Vicksburg, MS (US); Jose A. Mattei-Sosa, Vicksburg, MS (US); Luke A. Gurtowski, Vicksburg, MS (US); Lauren F. Greenlee, Fayetteville, AR (US); Mojtaba Abolhassani, Yazd (IR)

(73) Assignees: Board of Trustees of the University of Arkansas, Little Rock, AR (US); The United States of America, as Represented by the Secretary of the Army, Washington, DC (US)

( * ) Notice: Subject to any disclaimer, the term of this patent is extended or adjusted under 35 U.S.C. 154(b) by 0 days.

(21) Appl. No.: 16/050,425

(22) Filed: Jul. 31, 2018

(65) Prior Publication Data
US 2019/0039027 A1 Feb. 7, 2019

Related U.S. Application Data

(63) Continuation-in-part of application No. 15/672,241, filed on Aug. 8, 2017, now Pat. No. 10,414,659, and (Continued)

(51) Int. Cl.
*B01D 69/14* (2006.01)
*B01D 71/02* (2006.01)
(Continued)

(52) U.S. Cl.
CPC ........ *B01D 69/148* (2013.01); *B01D 67/0011* (2013.01); *B01D 67/0013* (2013.01);
(Continued)

(58) Field of Classification Search
CPC .. B01D 69/148; B01D 63/10; B01D 67/0011; B01D 67/0013; B01D 69/06;
(Continued)

(56) References Cited

U.S. PATENT DOCUMENTS

| | | | |
|---|---|---|---|
| 2014/0079932 A1* | 3/2014 | Aksay | B82Y 30/00 428/219 |
| 2016/0354729 A1* | 12/2016 | Krishna | B01D 69/148 |

FOREIGN PATENT DOCUMENTS

| | | | | |
|---|---|---|---|---|
| CN | 102653596 | * | 12/2013 | B01J 20/28 |

OTHER PUBLICATIONS

Shao, et al., Graphene oxide cross-linked chitosan nanocomposite membrane, Applied Surface Science 2013; 280: 989-992 (Year: 2013).*

(Continued)

*Primary Examiner* — Daniel C. McCracken
(74) *Attorney, Agent, or Firm* — Crowe & Dunlevy, P.C.

(57) ABSTRACT

This invention relates generally to a chitosan-graphene oxide membrane and process of making the same. The nanocomposite membrane can filter water and remove contaminants without fouling like other commercially-available polymer-based water filters. The membrane can be used as a flat sheet filter or can be engineered in a spiral filtration module. The membrane is scalable and tunable for many water contaminants including pharmaceuticals, pesticides, herbicides, and other organic chemicals. The membrane uses chitosan, which is low-cost, renewable biopolymer typically considered to be a waste product and the second most
(Continued)

abundant biopolymer on Earth, thus making the membrane an environmentally-friendly product choice.

17 Claims, 40 Drawing Sheets

Related U.S. Application Data a continuation-in-part of application No. 15/671,043, filed on Aug. 7, 2017.

(51) Int. Cl.
- B01D 67/00 (2006.01)
- C02F 1/44 (2006.01)
- B01D 69/02 (2006.01)
- B01D 71/08 (2006.01)
- B01D 63/10 (2006.01)
- B01D 69/06 (2006.01)
- C02F 101/30 (2006.01)

(52) U.S. Cl.
CPC ......... *B01D 67/0079* (2013.01); *B01D 69/02* (2013.01); *B01D 71/024* (2013.01); *C02F 1/44* (2013.01); *B01D 63/10* (2013.01); *B01D 69/06* (2013.01); *B01D 71/021* (2013.01); *B01D 71/08* (2013.01); *B01D 2315/10* (2013.01); *B01D 2325/28* (2013.01); *C02F 2101/306* (2013.01); *C02F 2101/308* (2013.01)

(58) Field of Classification Search
CPC .. B01D 71/024; B01D 71/08; B01D 2315/10; C02F 1/44; C02F 2101/306; C02F 2101/308

See application file for complete search history.

(56) References Cited

OTHER PUBLICATIONS

Fan, et al., Highly selective adsorption of lead ions by water-dispersible magnetic chitosan/graphene oxide composites, Colloids and Surfaces B: Biointerfaces 2013; 103: 523-529 (Year: 2013).*

Definition of "about," accessed online at https://www.merriam-webster.com/dictionary/about on Feb. 18, 2019 (Year: 2019).*

Machine translation of CN 102653596 (Year: 2019).*

Jin, F.; Lv, W.; Zhang, C.; Li, Z.; Su, R.; Qi, W.; Yang, Q.-H.; He, Z. High-performance ultrafiltration membranes based on polyethersulfone-graphene oxide composites. RSC Adv. 2013, 3, 21394-21397.

Chang, X.; Wang, Z.; Quan, S.; Xu, Y.; Jiang, Z.; Shao, L. Exploring the synergetic effects of graphene oxide (GO) and polyvinylpyrrodione (PVP) on poly (vinylylidenefluoride)(PVDF) ultrafiltration membrane performance. Appl. Surf. Sci. 2014, 316, 537-548.

Shao, L.; Cheng, X.; Wang, Z.; Ma, J.; Guo, Z. Tuning the performance of polypyrrole-based solvent-resistant aomposite nanofiltration membranes by optimizing polymerization conditions and incorporating graphene oxide. J. Membr. Sci. 2014, 452, 82-89.

Yang, M.; Zhao, C.; Zhang, S.; Li, P.; Hou, D. Preparation of graphene oxide modified poly (m-phenylene isophthalamide) nanofiltration membrane with improved water flux and antifouling property. Appl. Surf. Sci. 2017, 394, 149-159.

Yin, J.; Zhu, G.; Deng, B. Graphene oxide (GO) enhanced polyamide (PA) thin-film anocomposite (TFN) membrane for water purification. Desalination 2016, 379, 93-101.

Travlou, N. A.; Kyzas, G. Z.; Lazaridis, N. K.; Deliyanni, E. A. Graphite oxide/chitosan composite for reactive dye removal. Chem. Eng. J. 2013, 217, 256-265.

He, Y. Q.; Zhang, N. N.; Wang, X. D. Adsorption of graphene oxide/chitosan porous materials for metal ions. Chin. Chem. Leff. 2011, 22, 859-862.

Chen, Y.; Chen, L.; Bai, H.; Li, L. Graphene oxide-chitosan composite hydrogels as broad-spectrum adsorbents for water purification. J. Mater. Chem. A 2013, 1, 1992-2001.

Yu, B.; Xu, J.; Liu, J.-H.; Yang, S.-T.; Luo, J.; Zhou, Q.; Wan, J.;Liao, R.; Wang, H.; Liu, Y. Adsorption behavior of copper ions on graphene oxide-chitosan aerogel. J. Environ. Chem. Eng. 2013, 1,1044-1050.

Fan, L.; Luo, C.; Sun, M.; Li, X.; Qiu, H. Highly selective adsorption of lead ions by water-dispersible magnetic chitosan/graphene oxide composites. Colloids Surf., B 2013, 103, 523-529.

Abolhassani, M.; Griggs, C.; Gurtowski, L; Mattei-Sosa, J.; Nevins, M.; Medina, V.; Morgan, T.; Greenlee, L.; Scalable Chitosan-Graphene Oxide Membranes: The Effect of GO Size on Properties and Cross-Flow Filtration Performance. ACS Omega 2017, 2, 8751-8759.

Abolhassani, M.; Griggs, C.; Mattel-Sosa, J.; Nevins, M.; Gurtowski, L.; Medina, V.; Greenlee, L.; Chitosan-Graphene Oxide Lamellar Membranes and Application in Wastewater Treatment. ICOM Poster, Aug. 1, 2017.

* cited by examiner

CHITOSAN-GRAPHENE OXIDE MEMBRANES AND PROCESS OF MAKING THE SAME

CROSS REFERENCE TO RELATED APPLICATIONS

This application claims priority to and is a continuation-in-part of U.S. patent application Ser. No. 15/671,043 entitled ADVANCED FILTRATION MEMBRANES USING CHITOSAN AND GRAPHENE OXIDE filed on Aug. 7, 2017, claims priority to and is a continuation-in-part of U.S. patent application Ser. No. 15/672,241 entitled METHOD OF RECYCLING CHITOSAN AND GRAPHENE OXIDE COMPOUND filed on Aug. 8, 2017, and incorporates each of the foregoing applications by reference in its entirety into this document as if fully set out at this point.

BACKGROUND OF THE INVENTION

1. Field of the Invention

This invention relates generally to a chitosan-graphene oxide membrane and process of making the same, and more particularly to a scalable chitosan-graphene oxide composite membrane that can be cast from a solution into a flat sheet and then engineered into a spiral wound membrane filtration module.

2. Description of the Related Art

Membrane filtration is a cost-effective water treatment method that provides excellent removal for a wide range of aqueous contaminants with a relatively long lifetime and high product recovery. Novel nanomaterials provide an opportunity to develop membranes in the nanofiltration regime that can address the removal of contaminants not typically removed by microfiltration or ultrafiltration. Polymeric membranes are the most favorable candidates for nanofiltration membranes due to advantageous thermal and chemical stability. Thermal and chemical stability in a wide range of pH are observed for different polymeric membranes, including polyethersulfone (PES), poly(vinylidenefluoride) (PVDF), polypyrrole (PPy), Poly (m-phenylene isophthalamide) (PMIA), polyamide (PA), and polysulfone (PSF). However, membrane fouling, low flux, and low hydrophilicity are challenges that remain. Further, most polymers are derived from petroleum and thus represent a fossil-fuel-based resource that presents opportunities for more environmentally-sustainable alternatives.

Chitosan (CS) is a polymer and a derivative of chitin, which is the second most abundant naturally-occurring biopolymer on Earth. Due to its biocompatibility, biodegradability, low toxicity, and antibacterial and hemostatic properties, CS is a promising low-cost, renewable alternative to petroleum-based synthetic polymers. Moreover, CS contains amino and hydroxyl functional groups, which make CS hydrophilic. However, the weak mechanical properties and the solubility of CS in acidic aqueous environments are two critical challenges. Modification methods, including cross-linking strategies and the use of mechanical reinforcement agents, can result in a more robust membrane material that can overcome these drawbacks.

Carbon nanotubes (CNTs) and graphene as carbon-based nanofillers are not ideal due to toxicity, hydrophobic properties, and agglomeration. Graphene oxide (GO) is produced by chemical modification of graphene, where oxidation causes the addition of hydroxyl, carboxyl, and epoxide functional groups to the basal planes and edges of the graphene sheets. These functional groups make GO amphiphilic with hydrophobic basal planes and hydrophilic edges. GO also has a high surface area, and studies have shown that it is effective for adsorptive removal of heavy metal ions and cationic dyes from water. The oxidative surface modification of GO also enables its use as a dispersible nanofiller for water filtration membranes, due to the strong interactions between hydrophilic polymer functional groups and GO. The addition of GO to polymeric membranes comprised of PA, PES, PMIA, PSF, and PVDF resulted in decreased fouling, as well as increased hydrophilicity and flux. The addition of GO to a polymer matrix can also improve the thermal stability and mechanical strength of the membrane and results in demonstrated increases in salt rejection for PA, protein rejection for PES, arsenic rejection for PSF, and dye rejection for PMIA membranes.

Chitosan-graphene oxide (CSGO) nanocomposites have been investigated for drug delivery, bone tissue engineering, and water treatment. Strong hydrogen bonds and electrostatic attraction between negatively charged GO sheets and positively charged polysaccharide groups in CS make CSGO a stable and biocompatible nanocomposite with excellent mechanical and thermal properties. Therefore, CSGO composites can potentially be used for hydrostatic pressure-based water filtration applications, where mechanical stability is necessary. However, the application of CSGO as a membrane or film has been limited to tissue engineering, drug delivery, sensors, and similar applications. In water treatment applications, CSGO nanocomposites have primarily been used as an adsorbent to remove contaminants such as chromium, copper ions, other metal ions, and dye molecules from water. Prior reports on GO membranes have been limited to small experimental volumes and short durations, which are not representative of real-world membrane operation.

It is therefore desirable to provide a chitosan-graphene oxide membrane and process of making the same that overcomes the shortcomings of the prior processes.

It is further desirable to provide a scalable chitosan-graphene oxide composite membrane that can be cast from a solution into a flat sheet and then engineered into a spiral wound membrane filtration module.

It is still further desirable to provide a chitosan-graphene oxide membrane that has benefits over each material and over other polymer materials, including low cost, processability, scalability, anti-fouling, tunable flux and porosity, tunable contaminant rejection, and use of a biopolymer waste product.

It is yet further desirable to provide a chitosan-graphene oxide composite membrane constructed of a granular or a nanoscale GO particle with a predetermined size for optimal pressure-driven water filtration.

Before proceeding to a detailed description of the invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

In general, in a first aspect, the invention relates to a chitosan-graphene oxide composite membrane having up to about 25% by weight graphene oxide and up to about 75% by weight chitosan. The graphene oxide has a flake size between about 80 nm and about 105 nm in diameter or between about 0.3 m and about 0.7 m in diameter. The chitosan-graphene oxide composite membrane can be scalable and configured as a flat sheet or be spiral wound.

In general, in a second aspect, the invention relates to a process for making a chitosan-graphene oxide composite membrane. The process includes the steps of mixing graphene oxide with purified water, mixing chitosan with an acid (e.g., acetic acid), preparing a casting solution comprising the chitosan and the graphene oxide, and then evaporating the casting solution under reduced pressure to make the chitosan-graphene oxide composite membrane. The graphene oxide has a flake size between about 80 nm and about 105 nm in diameter or between about 0.3 m and about 0.7 m in diameter. The process can also include mixing the graphene oxide and the chitosan to form a homogenous mixture with a ratio of chitosan to graphene oxide of up to about 4:1 w/w.

The foregoing has outlined in broad terms some of the more important features of the invention disclosed herein so that the detailed description that follows may be more clearly understood, and so that the contribution of the named inventors to the art may be better appreciated. The invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

DETAILED DESCRIPTION OF THE INVENTION

Figure 1A:
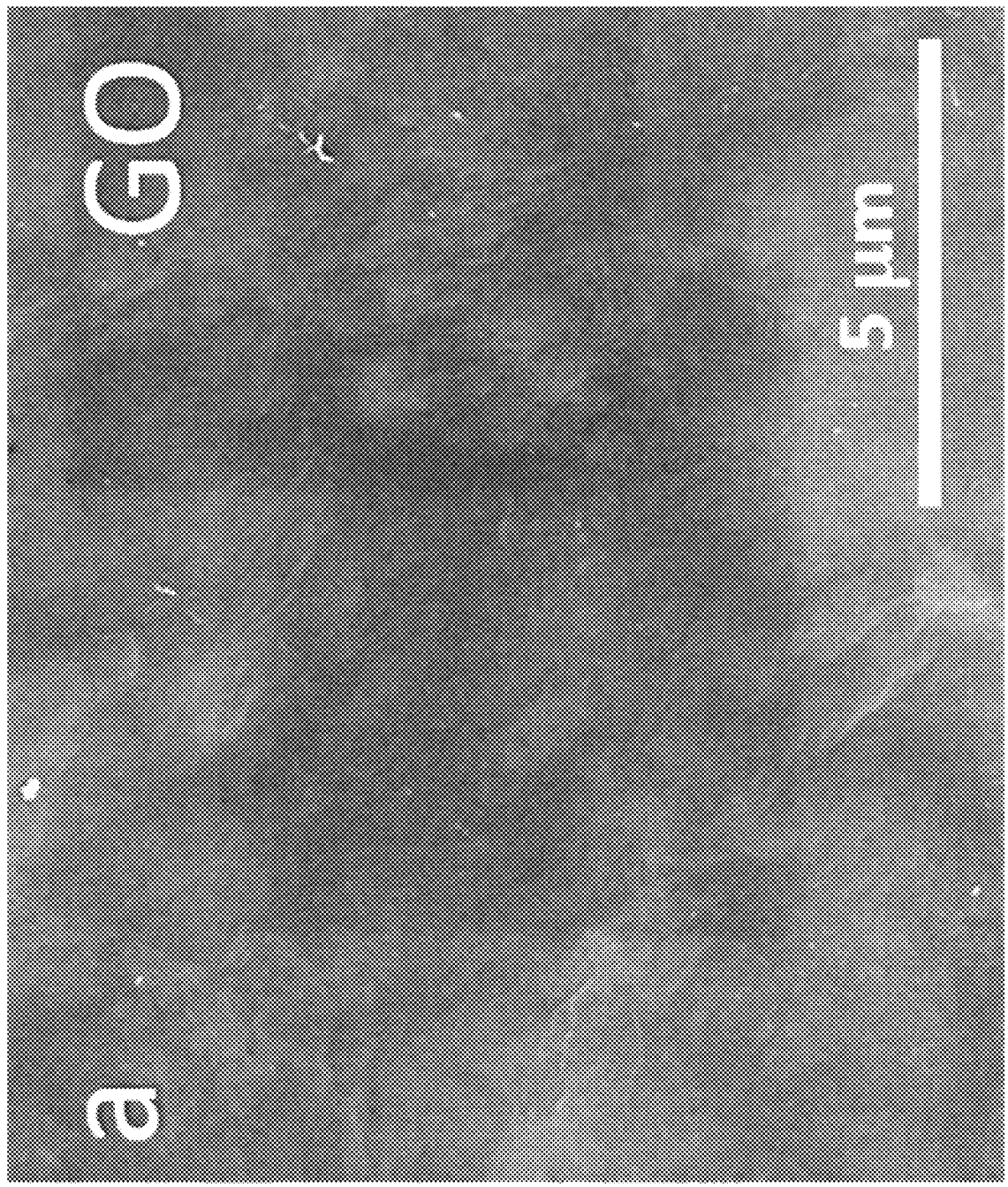
FIG. 1A is a scanning electron microscope (SEM) image of a top surface of a graphene oxide membrane in accordance with an illustrative embodiment of the invention disclosed herein.
Figure 1B:
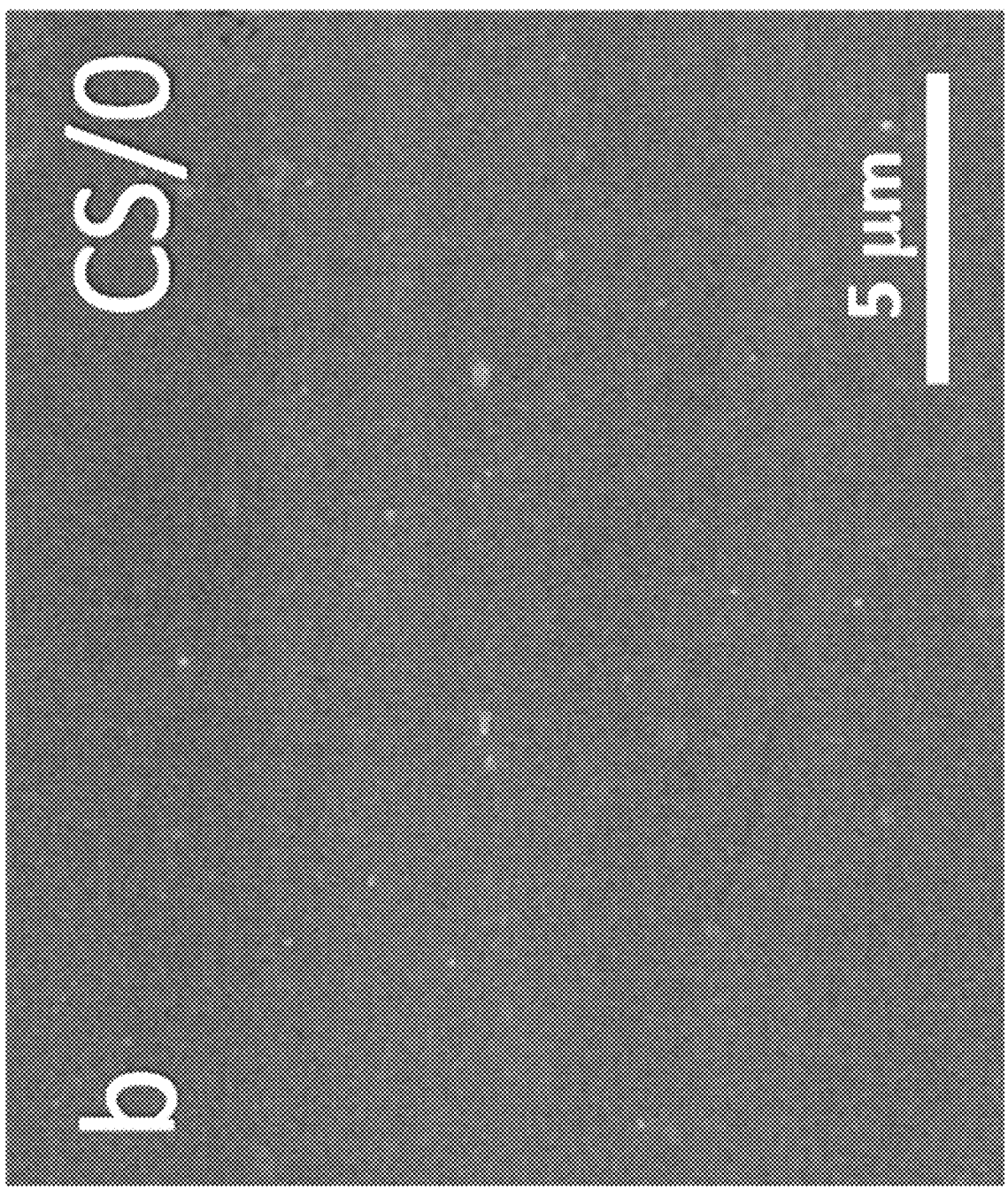
FIG. 1B is an SEM image of a top surface of a CS/0 membrane in accordance with an illustrative embodiment of the invention disclosed herein.
Figure 1C:
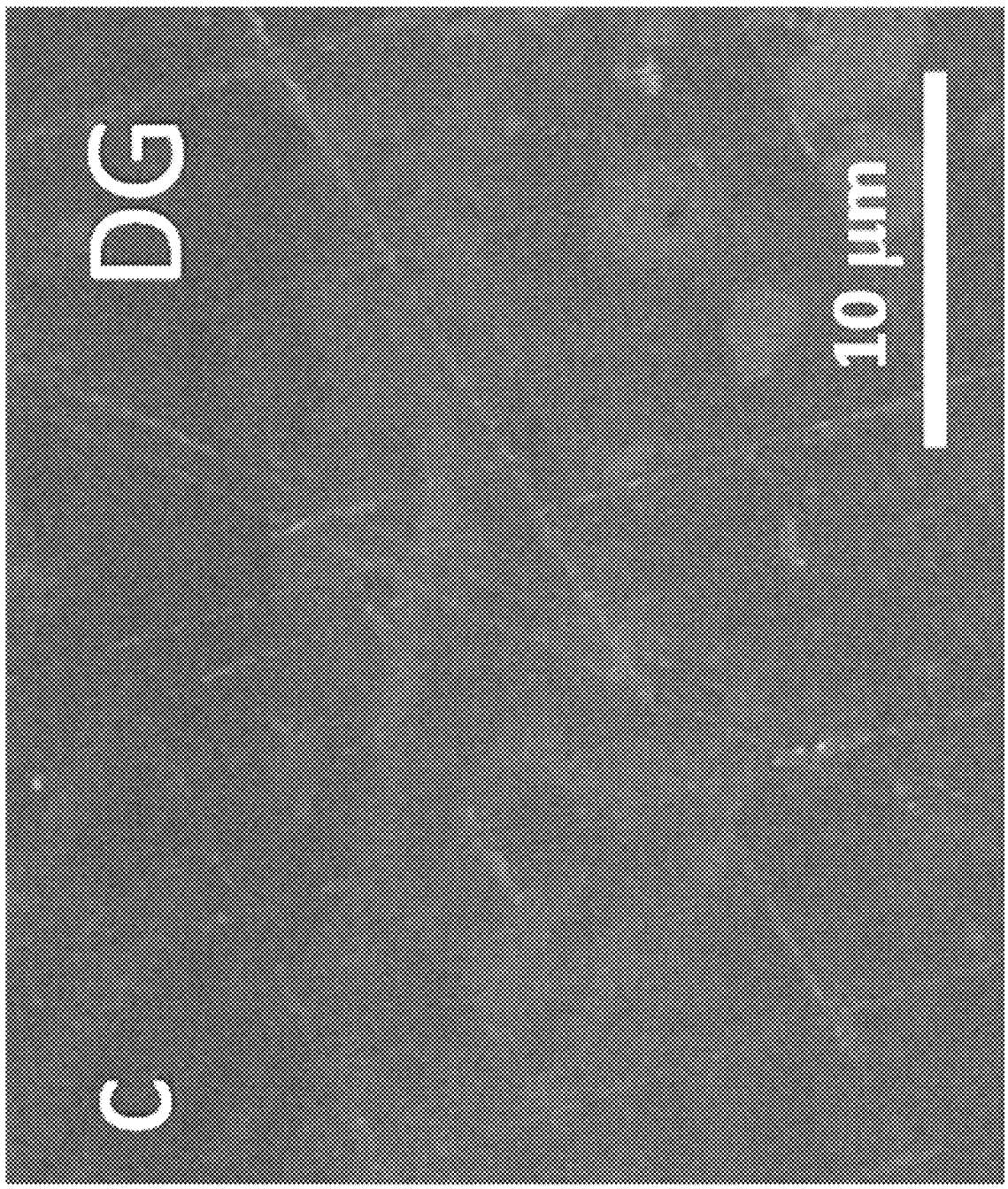
FIG. 1C is an SEM image of a top surface of a DG-CSGO membrane in accordance with an illustrative embodiment of the invention disclosed herein.
Figure 1D:
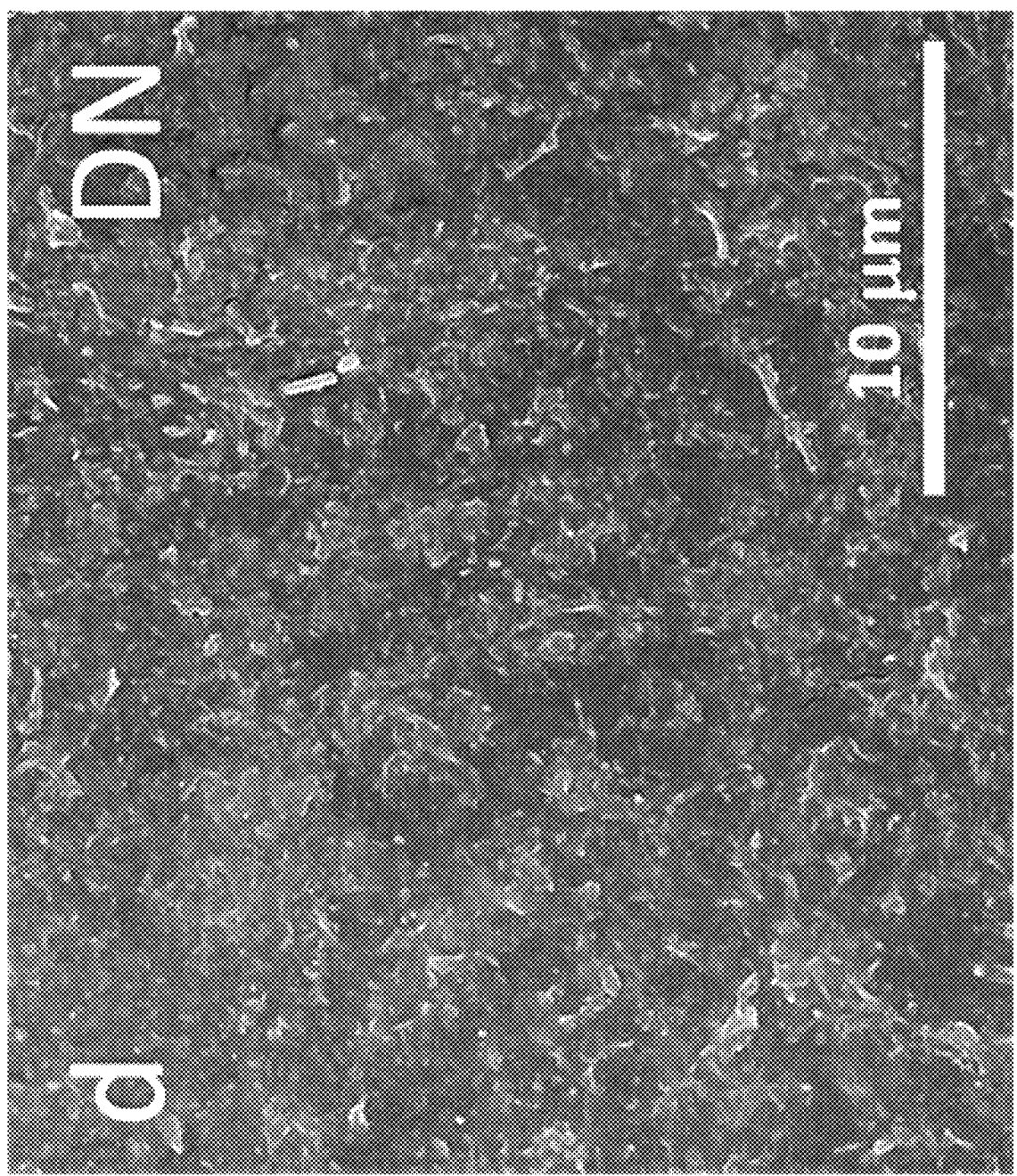
FIG. 1D is an SEM image of a top surface of a DN-CSGO membrane in accordance with an illustrative embodiment of the invention disclosed herein.
Figure 1E:
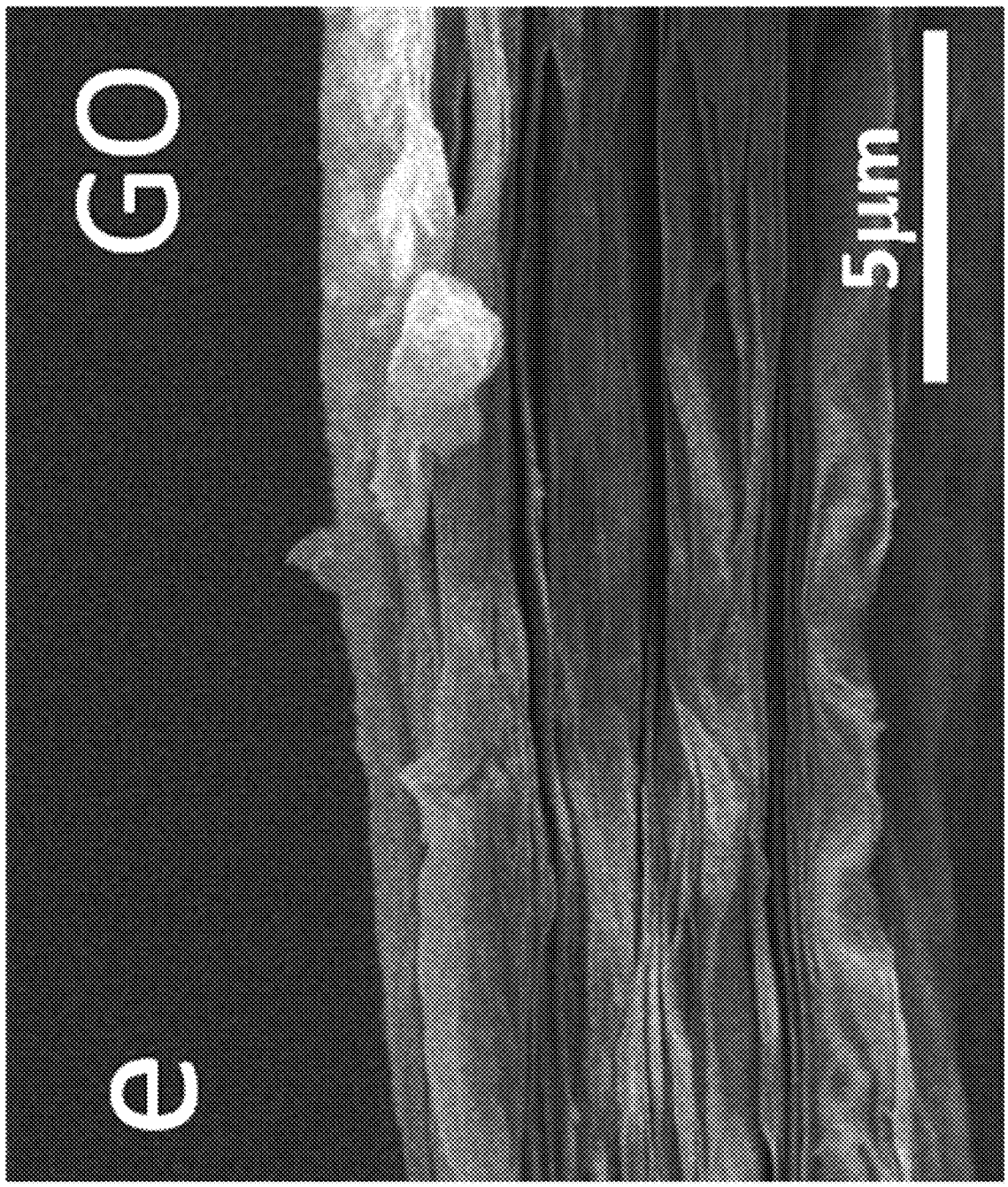
FIG. 1E is an SEM image of a top surface of a GO membrane in accordance with an illustrative embodiment of the invention disclosed herein.
Figure 1F:
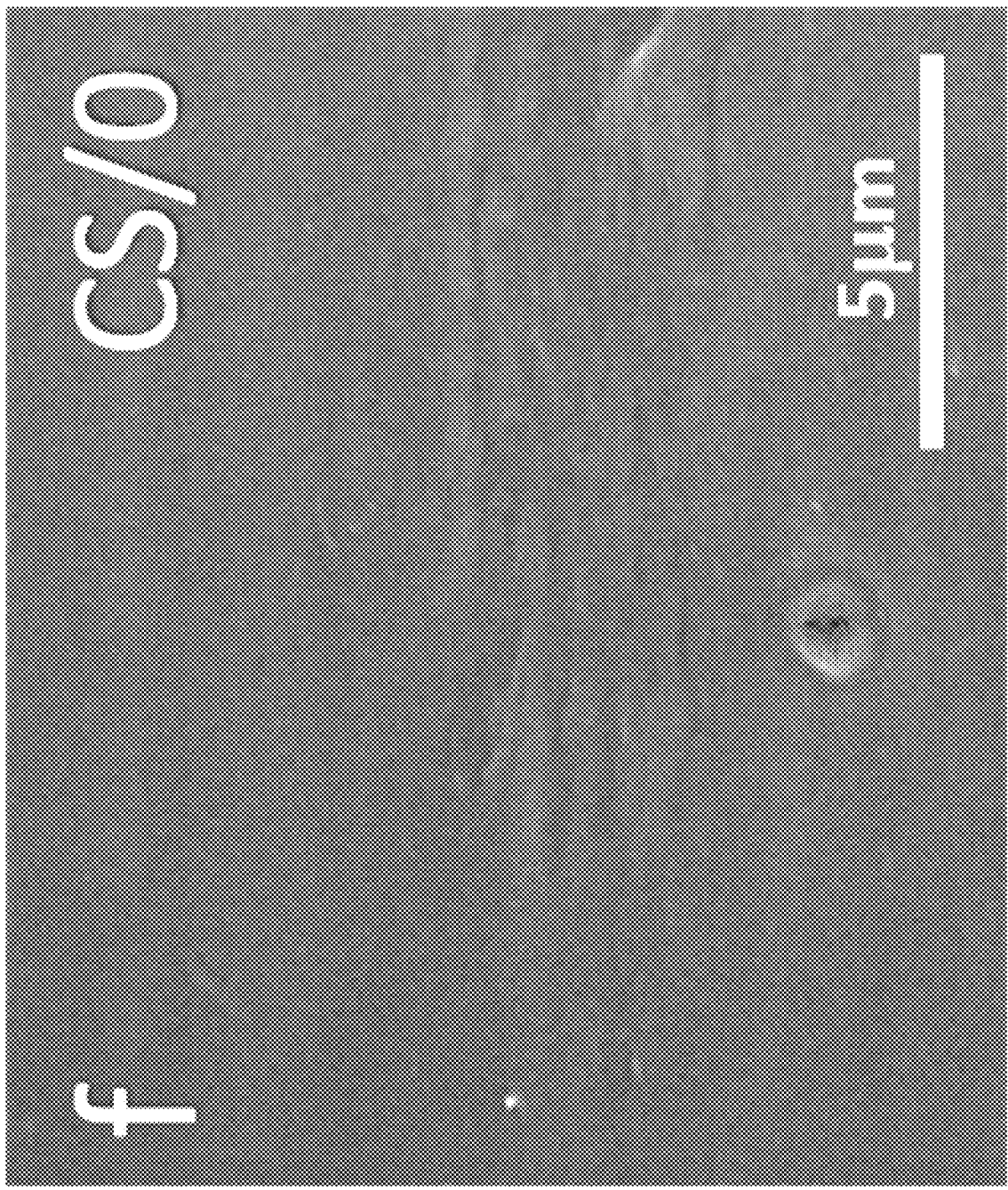
FIG. 1F is an SEM image of a top surface of a CS/0 membrane in accordance with an illustrative embodiment of the invention disclosed herein.
Figure 1G:
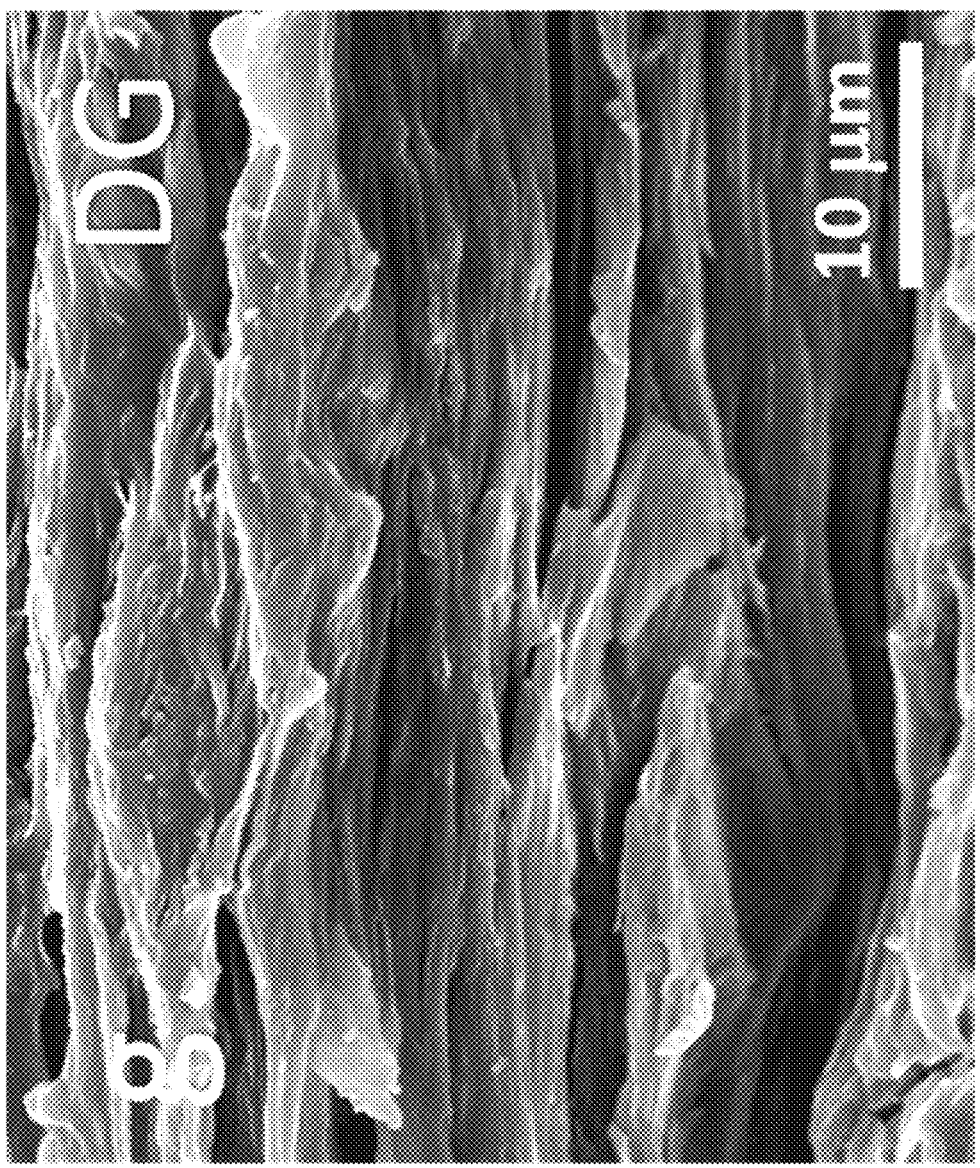
FIG. 1G is an SEM image of a top surface of a DG-CSGO membrane in accordance with an illustrative embodiment of the invention disclosed herein.
Figure 1H:
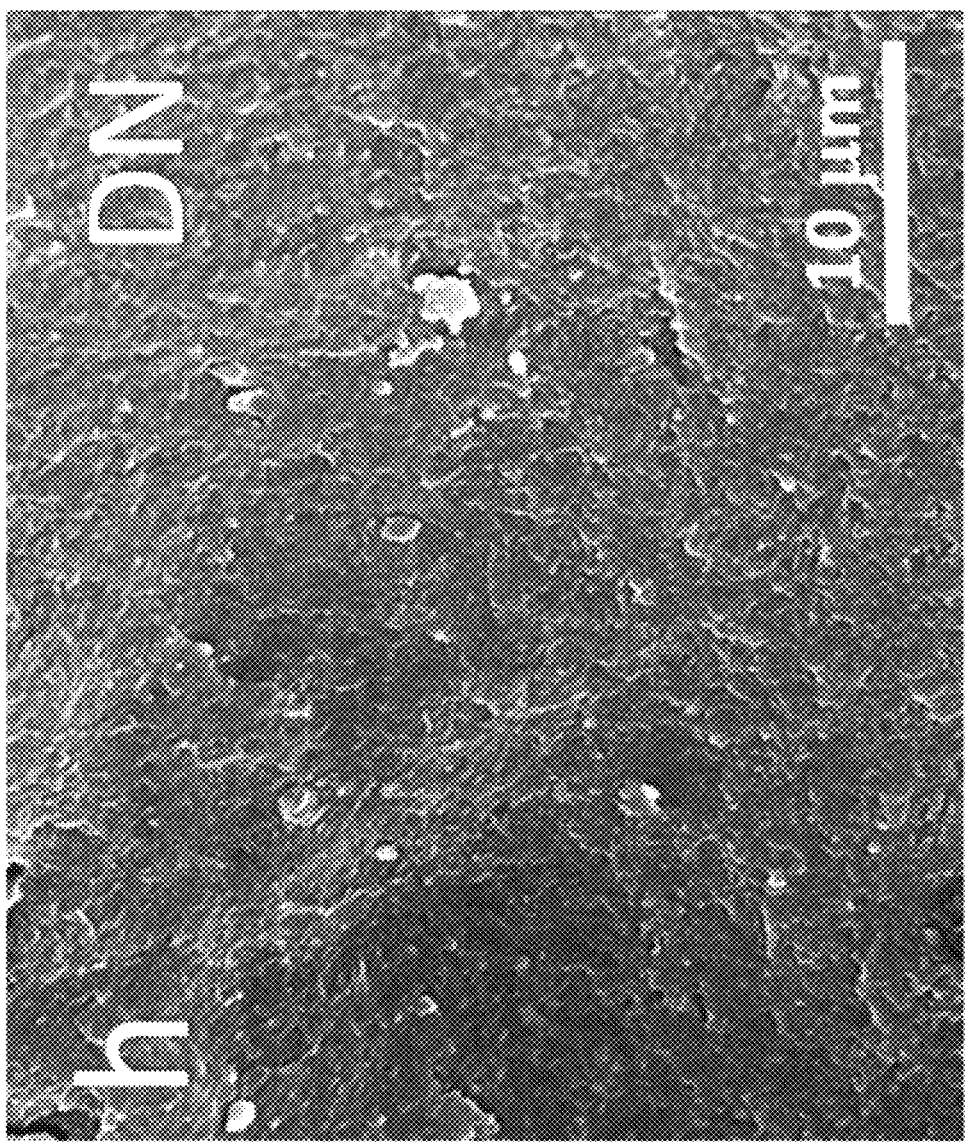
FIG. 1H is an SEM image of a top surface of a DN-CSGO membrane in accordance with an illustrative embodiment of the invention disclosed herein.

While this invention is susceptible of embodiment in many different forms, there is shown in the drawings, and will herein be described hereinafter in detail, some specific embodiments of the invention. It should be understood, however, that the present disclosure is to be considered an exemplification of the principles of the invention and is not intended to limit the invention to the specific embodiments so described.

The invention relates to a chitosan-graphene oxide membranes and process of making the same that has a low cost, processability, scalability, anti-fouling, tunable flux and porosity, tunable contaminant rejection, and use of a biopolymer waste product. The scalable chitosan-graphene oxide composite membrane can be cast from a solution into a flat sheet and then engineered into a spiral wound membrane filtration module. In particular, the scalable chitosan-graphene oxide composite membrane can be formed into a flat sheet from a chitosan-graphene oxide casting solution of water and an organic acid as described in U.S. patent application Ser. No. 15/671,043 entitled ADVANCED FILTRATION MEMBRANES USING CHITOSAN AND GRAPHENE OXIDE and in U.S. patent application Ser. No. 15/672,241 entitled METHOD OF RECYCLING CHITOSAN AND GRAPHENE OXIDE COMPOUND, which are both hereby incorporated herein by reference in their entireties.

The chitosan-graphene oxide composite membrane has membrane surfaces and internal morphology that is controlled by graphene oxide flake size. The chitosan-graphene oxide membrane can contain between about 16% and about 25% graphene oxide by weight or contain a ratio between about 4:1 to about 6:1 of chitosan to graphene oxide. In addition, the chitosan-graphene oxide membrane contains either nanoscale (e.g., between about 80 and about 105 nm in diameter) or granular, micron-scale (e.g., between about 0.3 and about 0.7 µm in diameter) graphene oxide composite particles. The graphene oxide particles are fully exfoliated in the chitosan polymer matrix. The chitosan and graphene oxide are initially stabilized through hydrogen bonding and electrostatic interactions. Post-treatment of the membrane can cause the formation of covalent bonds that further stabilize the membrane. The membrane is formed by casting the chitosan-graphene oxide casting solution onto a flat mold and allowing the water to evaporate. The flat sheet membrane formed can then be engineered into a spiral wound membrane module. The membranes have demonstrated anti-fouling and antimicrobial properties. The membranes are able to reject positively charged contaminants through a physical rejection mechanism, while negatively charged contaminants is rejected by a dual mechanism of adsorption and physical rejection.

EXAMPLES

The chitosan-graphene oxide membranes and process of making disclosed herein is further illustrated by the following examples, which are provided for the purpose of demonstration rather than limitation.

Materials:

Graphene oxide was used in the dry solid and water-dispersed state. GO was obtained commercially as an aqueous suspension with a concentration of 6.2 g/L (Graphene Supermarket, Calverton, N.Y.). Granular and nanoscale dry solids GO samples were also obtained at two different commercially-reported particle sizes (granular, around 90% 0.3-0.7 µm and nanoscale, around 90% 80-105 nm, Graphene Supermarket, Calverton, N.Y.). The chitosan used was a form of deacetylated chitin from Sigma Aldrich (medium molecular weight, Poly-D-glucosamine). Acetic acid was obtained from Sigma Aldrich (>99%). Methylene blue (MB) was used as a cationic molecular probe for this study and has a molecular weight (MW) of 319.85 g/mol and a density of 1.77 g/mL. Methyl orange (MO) (MW=327.33 g/mol) was used as an anionic molecular probe. Solutions of MB and MO were prepared from laboratory grade powder obtained from Merck and Fisher Scientific, respectively. Millipore nitrocellulose membranes from Bio-Rad (Hercules, Calif.) (Roll, 0.45 m, 30 cm×3.5 m, Cat #:1620115) were used for mechanical support during cross-flow filtration. Anopore Anodized Aluminum Oxide Anodiscs® were obtained from Whatman® GE Healthcare Life Sciences (0.2 µm pore size, 60 µm thick, 47 mm diameter) and were used for vacuum filtration of GO suspensions.

Preparation of Graphene Oxide (GO) Membranes:

To prepare GO membranes, 50 mL GO suspensions were prepared by diluting the commercial GO suspension (6.2 g/L) to 1 g/L with purified water. The suspension was sonicated for 1 h and placed on a porous anodized aluminum oxide (AAO) filter for vacuum filtration. The pH of the suspension was approximately 3 due to residual acid content from graphene oxidation. Filtration of the suspension took approximately 72 h, at which point dissolution of Al3+ from the AAO filter provided a cross-linking agent for the GO laminate membrane to form as the GO flakes assembled on the AAO filter.

Preparation of Chitosan Membranes (CS/0):

To prepare CS/0 membranes, 500 mg of medium molecular weight CS, was added to a 100 mL Nalgene bottle containing 50 mL of water and approximately 0.33 mL of 99% acetic acid. This procedure was followed by stirring the solution for 72 hours. Finally, the solution was poured into a petri dish and dried in an incubator for 48 hours.

Preparation of Chitosan/Graphene Oxide (CSGO) Membranes:

A CS-rich GO suspension was prepared as follows: 0.3013 g of GO powder was added to 100 mL of purified water, stirred for 15 min, and sonicated for 30 min. The dispersion was then poured into an Erlenmeyer flask with 1.5 g of CS and 1 mL of acetic acid (1% acetic acid solution). The composition of this casting solution was 1.5 wt % CS and 0.3 wt % GO, and the CS/GO ratio in the cast membrane was 5:1 w/w. This dispersion was placed on a stir plate and stirred for 3 days at the highest speed. The mixing caused the CS powder to fully dissolve and the GO to disperse in the aqueous acetic acid solution and form a uniform mixture with a metallic gray color. The CSGO membranes were fabricated by evaporation under reduced pressure for 72 h which eliminated the need for the AAO filter support used for GO-only membranes.

Morphological and Chemical Analysis:

Surface and cross-sectional membrane morphology was evaluated by scanning electron microscopy (SEM, Nova Nanolab 200, 15 kV). For cross-sectional observation, liquid nitrogen was used to freeze the samples before fracturing; the membranes were then freeze-fractured so that the membrane cross-section was exposed. Membrane sections were mounted onto SEM stubs with the top surface, bottom surface, or cross-section oriented for imaging. The films were sputter coated with gold to prevent charging and then analyzed by SEM. Attenuated total reflectance Fourier transform infrared spectrometry (ATR-FTIR) (Spectrum BX FTIR spectrophotometer equipped with Pike ATR accessory) was used to evaluate the molecular interactions between GO and CS. The spectra were obtained at 8 $cm^{-1}$ resolution in the absorbance wavelength range of 4000-500 $cm^{-1}$. X-ray photoelectron spectroscopy (XPS; PHI Versaprobe 5000 with PHI MultiPack data analysis software) was used to evaluate the chemical composition of the films. Initial survey scans (0-1400 eV binding energy) were followed by detailed scans for carbon (275-295 eV) and nitrogen (390-410 eV). High resolution x-ray diffraction (XRD, Philips X'Pert—MRD diffractometer, Cu Kα radiation source) was used to determine the crystallinity of the samples. XRD patterns were taken within recorded region of 2θ from 5 to 350 with a scanning speed of 1 $min^{-1}$ at a voltage of 45.0 kV and a current of 40.0 mA.

Tensile Strength Testing:

To measure the mechanical properties of the CS/0 and CSGO membranes, a universal mechanical testing machine (Instron 5944) was used to obtain stress-strain curves. The samples were cut in the same shape (40×10 mm) with a different thickness which was measured by cross-section SEM images (FIGS. 6A-6D). Five replicates were performed for each membrane at room temperature with a strain rate 5.0 mm/min and 0.05 N preload.

Figure 5A:
FIG. 5A is a photograph of a flat sheet CSGO membrane cast from CSGO solution evaporation in accordance with an illustrative embodiment of the invention disclosed herein.
Figure 5B:
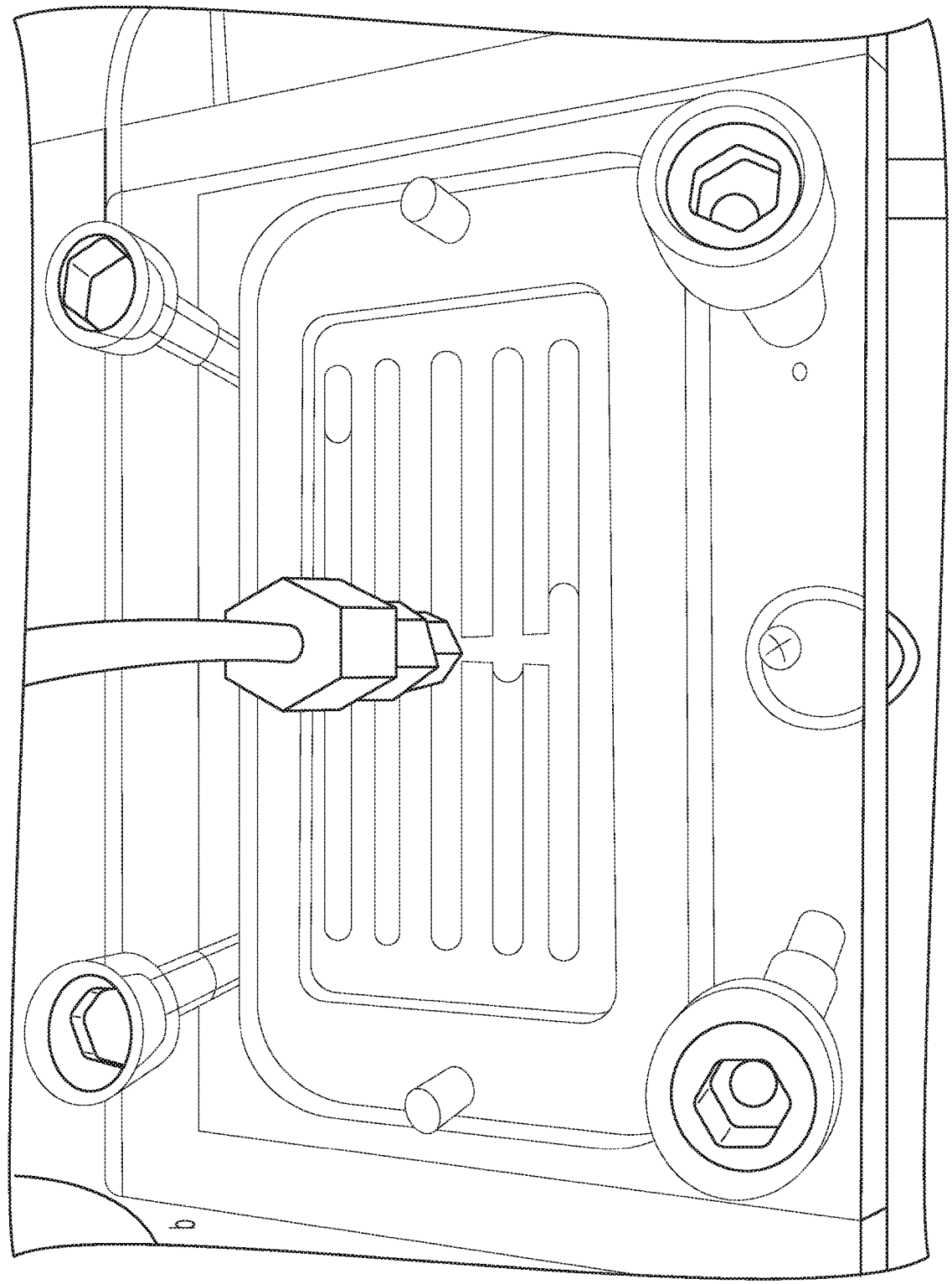
FIG. 5B is a photograph of a cross flow membrane cell used for performance testing in accordance with an illustrative embodiment of the invention disclosed herein.
Figure 5C:
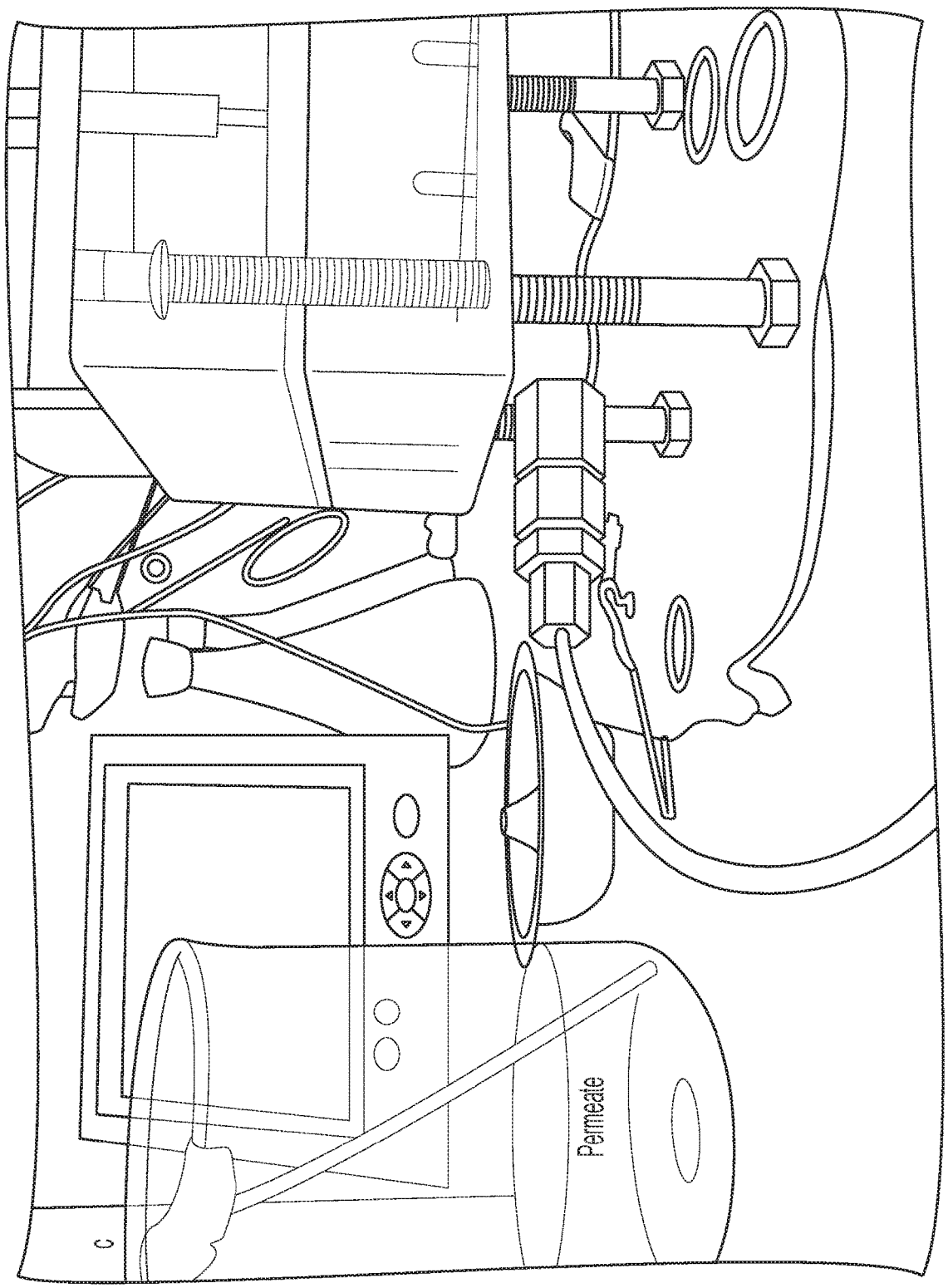
FIG. 5C is a photograph of collected permeate and retentate tube that returns retentate to the feed flask in accordance with an illustrative embodiment of the invention disclosed herein.
Figure 5D:
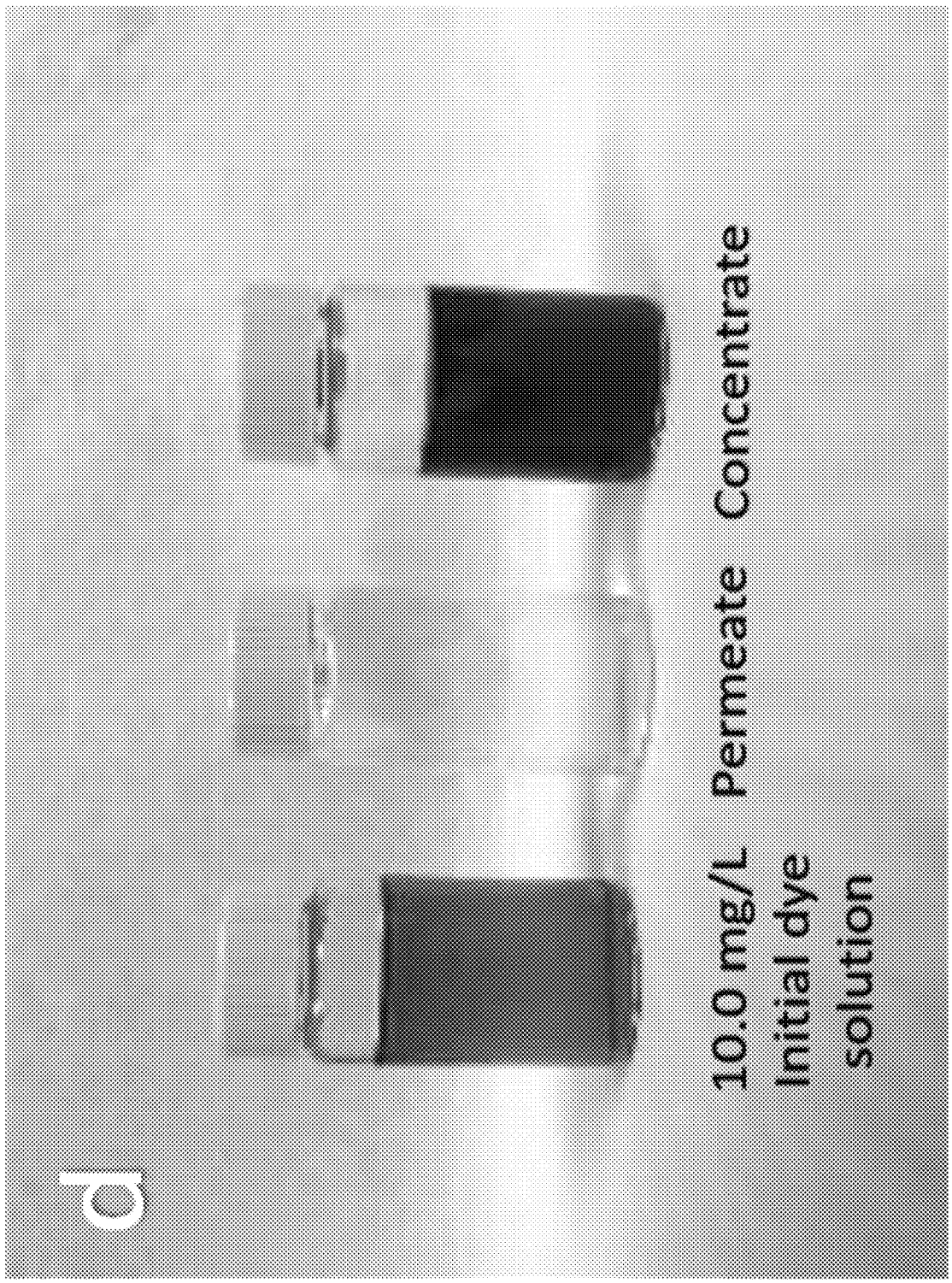
FIG. 5D is a photograph of collected samples for methylene blue analysis displaying an observable difference in dye concentration in the feed solution, permeate, and concentrate (retentate) in accordance with an illustrative embodiment of the invention disclosed herein.
Figure 5E:
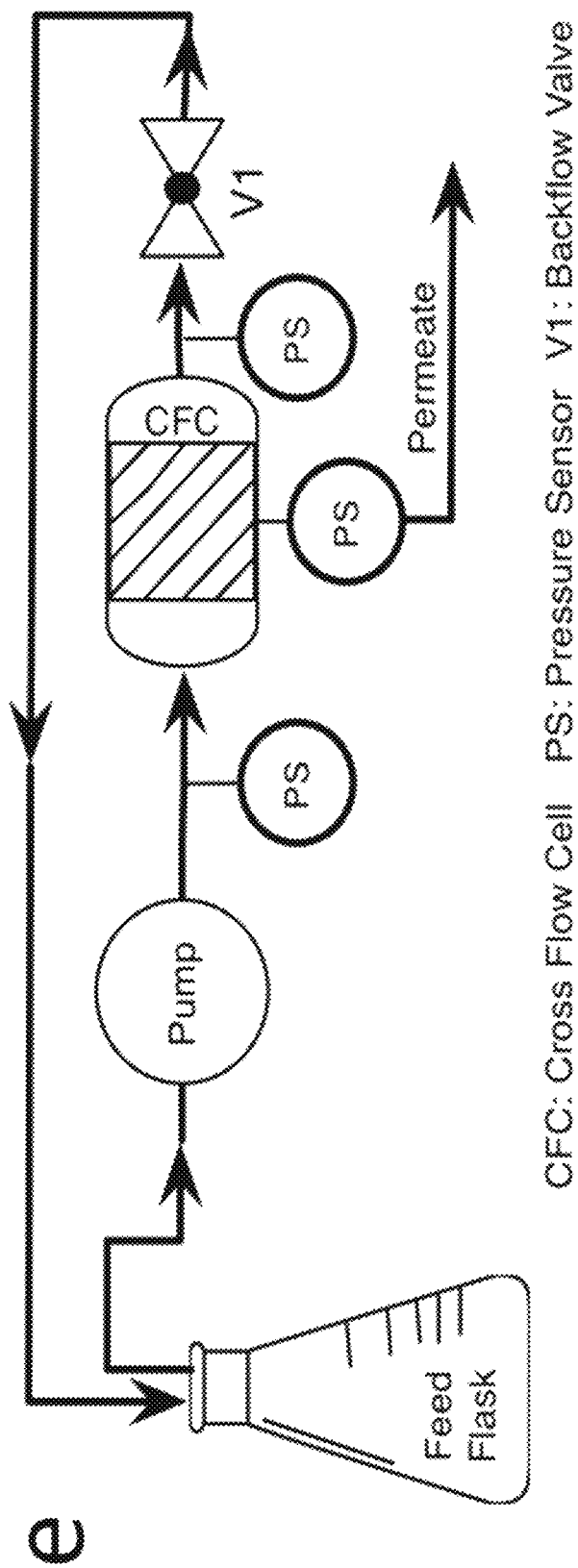
FIG. 5E is a schematic diagram of the cross flow membrane experimental setup in accordance with an illustrative embodiment of the invention disclosed herein.
Figure 6A:
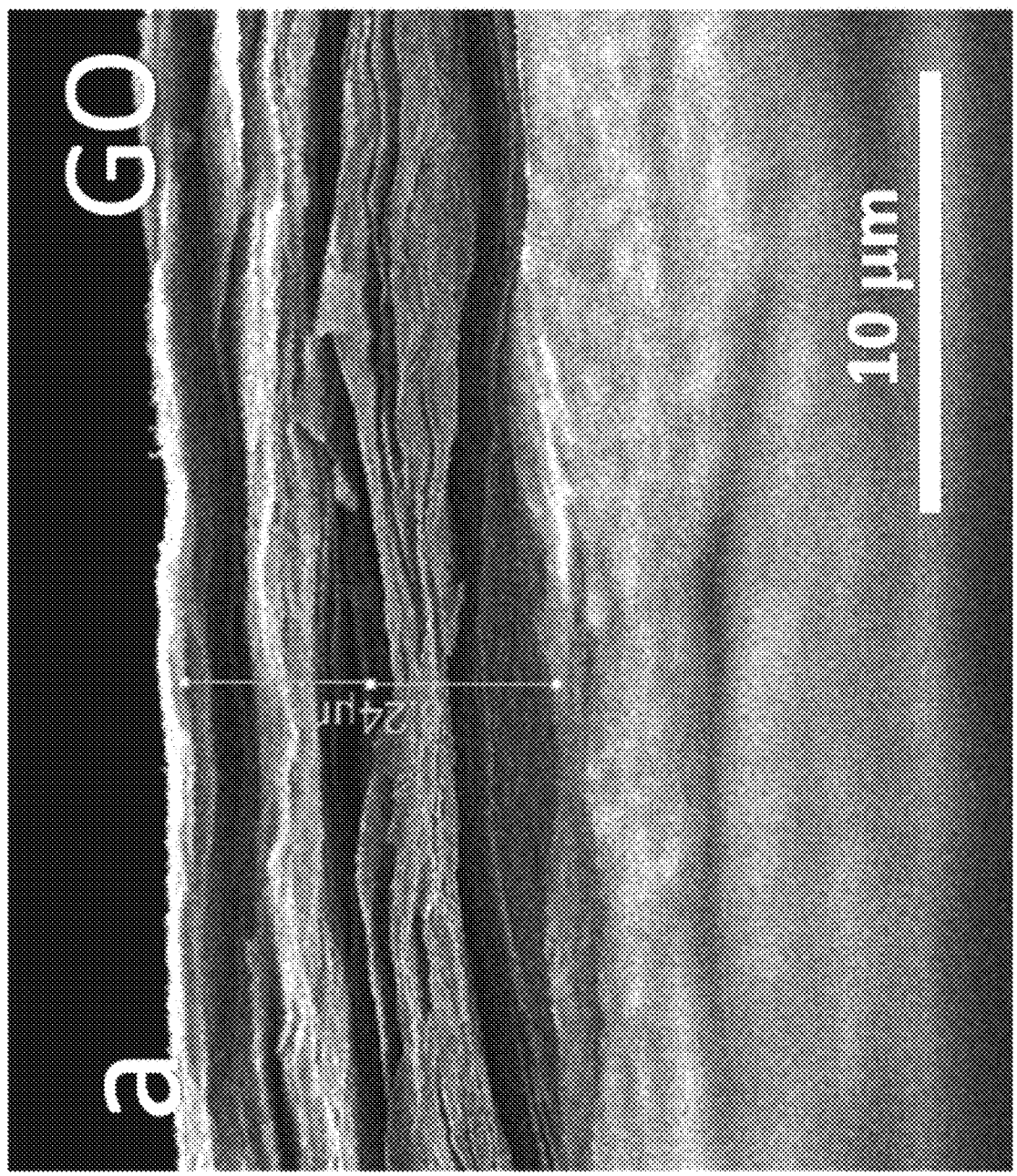
FIG. 6A is an SEM cross-section image of a GO membrane having a thickness of 8.2 μm in accordance with an illustrative embodiment of the invention disclosed herein.
Figure 6B:
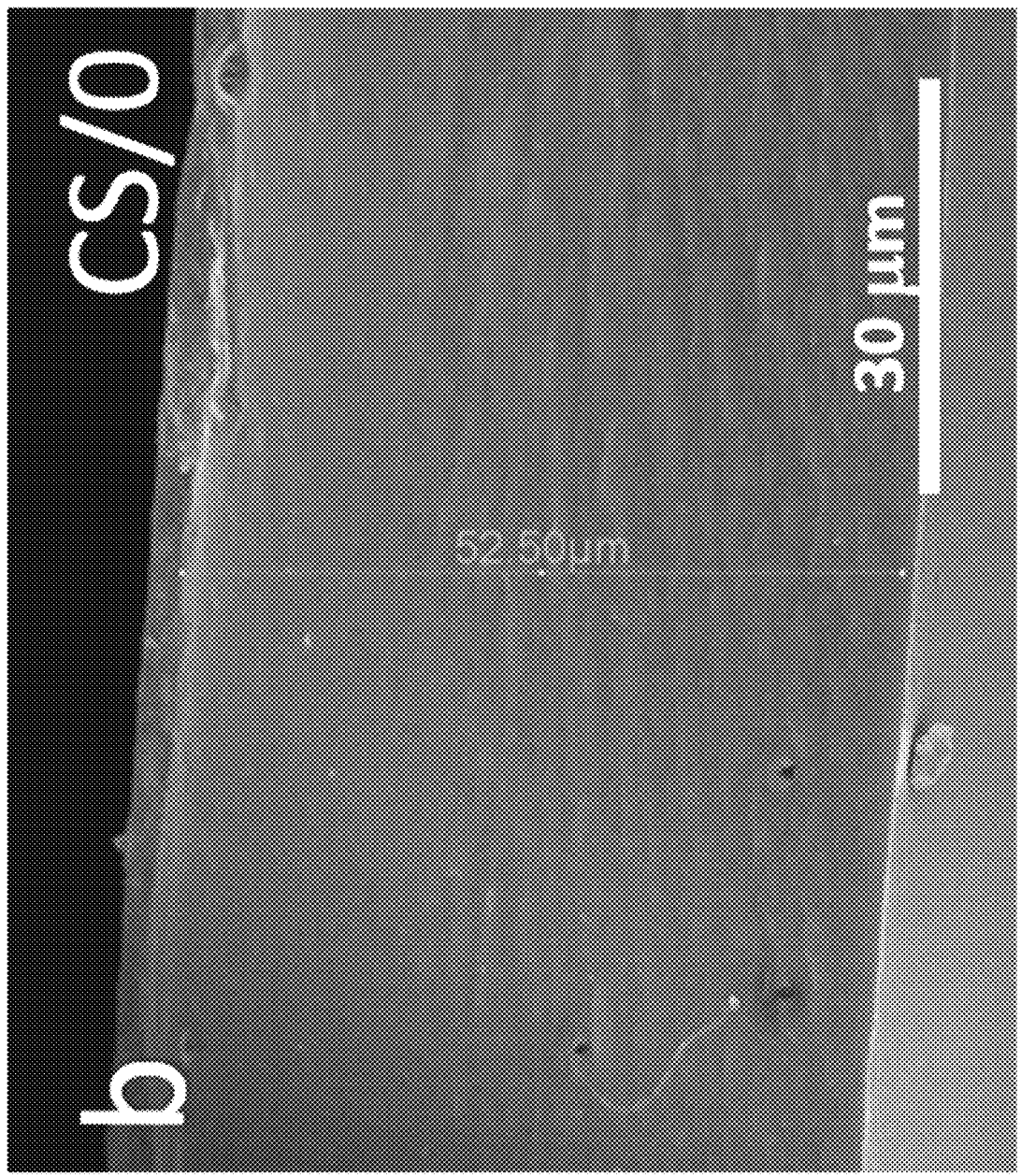
FIG. 6B is an SEM cross-section image of a CS/0 membrane having a thickness of 52.5 μm in accordance with an illustrative embodiment of the invention disclosed herein.
Figure 6C:
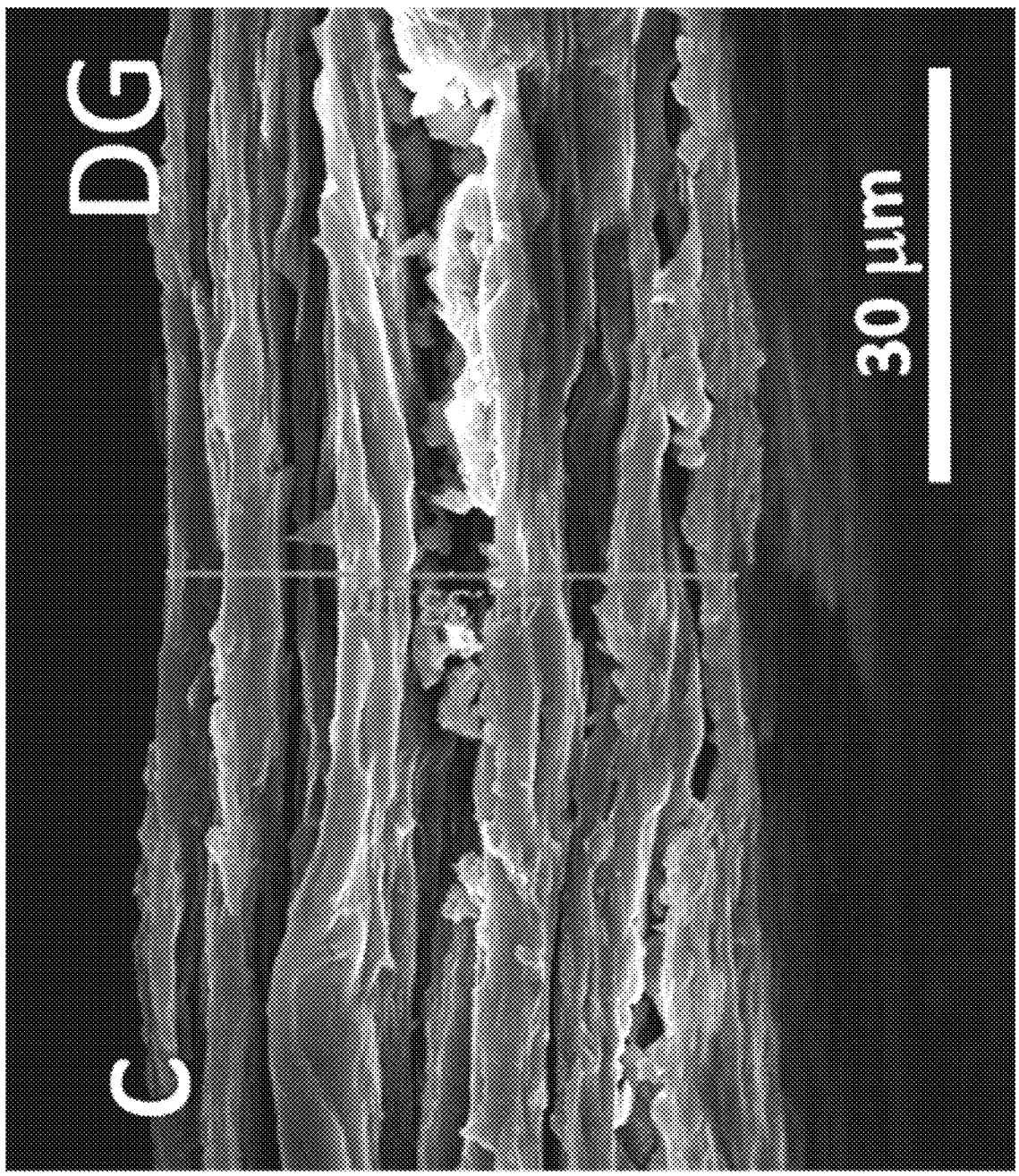
FIG. 6C is an SEM cross-section image of a DG-CSGO membrane having a thickness of 41.3 μm in accordance with an illustrative embodiment of the invention disclosed herein.
Figure 6D:
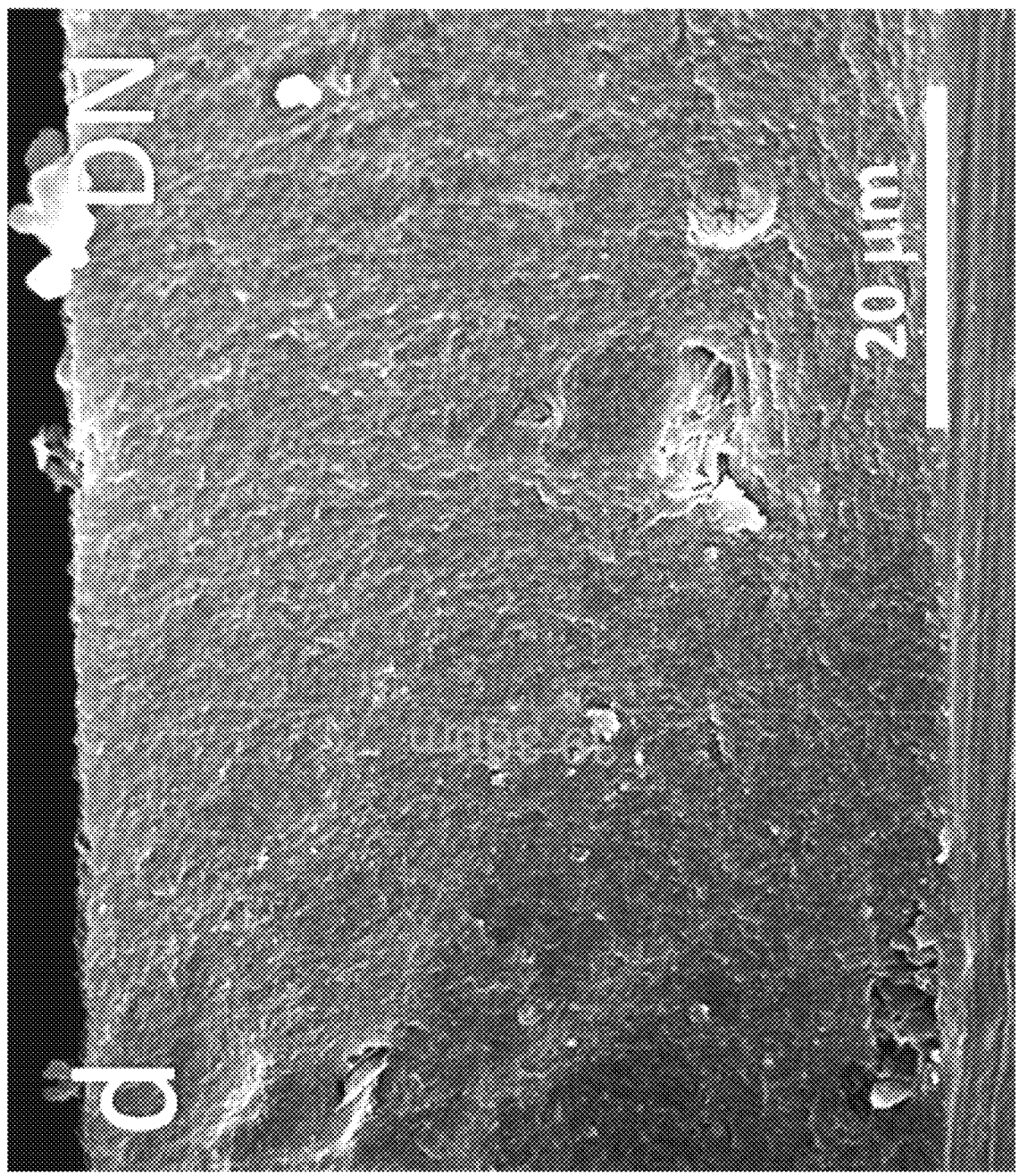
FIG. 6D is an SEM cross-section image of a DN-CSGO membrane having a thickness of 39.4 μm in accordance with an illustrative embodiment of the invention disclosed herein.

Membrane Filtration and Rejection Experiments:

Cross-Flow Setup:

After fabrication, the freestanding membranes were sectioned with a Sterlitech membrane die and placed one at a time in a cross-flow membrane cell to evaluate pure water flux and contaminant rejection. The cross-flow system (FIG. 5E) was set up such that the cell concentrate was recycled to the feed flask; this was done so that the cross-flow cell could run over several days with the same feed solution. Samples from the concentrate and permeate streams were collected at least once every 24 hours to determine flux and rejection. System and transmembrane pressure data were recorded via pressure transducers obtained from OMEGA Engineering. To control potential swelling of the membranes, the membrane was physically confined between two nitrocellulose microfiltration membranes (0.45 μm pore size, 30 cm×3.5 m) during cross-flow filtration. Control experiments were performed to confirm that when coupled with the CSGO membranes, the nitrocellulose support would not contribute to dye removal. Adsorptive removal with the nitrocellulose was less than 1% and was solely used as structural support for positive pressure tangential flow experiments.

Organic Dye Analysis:

CSGO membranes were tested for their ability to remove MB and MO in a series of cross-flow filtration experiments. Dye solution, at varying concentrations, was flowed through the cross-flow cell at pressures ranging from 69 kPa to 414 kPa. The initial and final concentrations for the concentrate and permeate were analyzed using an Agilent 8453 UV-visible spectrophotometer. A linear calibration curve was used to calculate MB and MO concentrations from absorbance readings, and the MB and MO detection limits were estimated at 0.005 mg/L and 0.1 mg/L, respectively.

Morphology of CSGO Membranes

GO, CS/0, and CSGO membranes were first characterized by SEM to assess the morphology and distribution of GO particles in the CS matrix (FIG. 1). CSGO membranes that contain granular and nanoscale GO are designated as DG-CSGO and DN-CSGO respectively. The GO membrane, GO-free CS/0 membrane, and DG-CSGO membrane in FIG. 1A, FIG. 1B, and FIG. 1C respectively, have a smooth and homogeneous top surface. However, the DN-CSGO membrane top surface, shown in FIG. 1D, has a rough top surface morphology, where the structures observed are due to the presence of nanoscale GO in the CS matrix. Since the top surface morphology of the DN-CSGO membrane is unlike that of either the GO membrane or the CS/0 membrane, it is difficult to evaluate whether the CS or the GO controls the top surface morphology. However, the different morphology observed in the DN-CSGO membrane suggests that the presence of GO can cause a change in morphology, as compared to GO-free CS/0.

The cross-sectional images in FIG. 1E-1H further support this conclusion, as the cross-section membrane morphology for GO (FIG. 1E) and DG-CSGO (FIG. 1G) are quite similar (layered structure of stacked sheets). In comparison, the cross-section membrane morphology for DN-CSGO membrane resulted in a nacre-like structure (FIG. 1H) which suggests GO sheets wrapped with CS polymer. Neither of the two CSGO membrane cross-sectional morphologies resemble the CS/0 cross-sectional morphology, which has a smooth, homogeneous morphology, similar to the CS/0 top surface morphology. Overall, it appears that the incorporation of GO into a CS membrane can cause significant changes to the top surface and cross-sectional morphology, where GO appears to control the resulting morphology, rather than CS. Furthermore, the size of the GO clearly has an impact on the resulting membrane morphology. Membrane thickness was determined to be 8.2, 52.5, 41.3, and 39.4 m for GO, CS/0, DG-CSGO, and DN-CSGO, respectively, using SEM cross-section images (FIGS. 6A-6D).

Figure 2A:
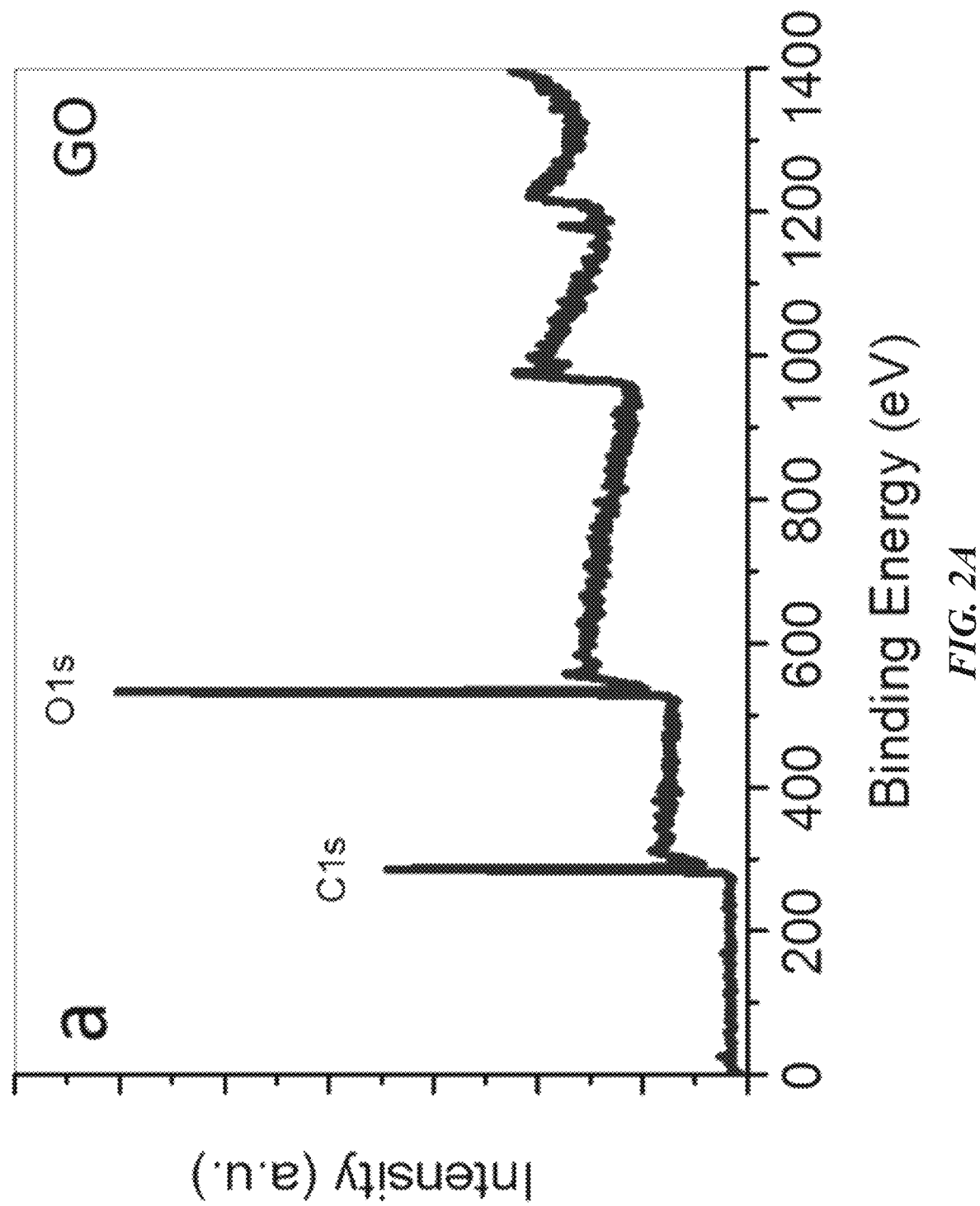
FIG. 2A is an XPS N is spectra of a GO membrane in accordance with an illustrative embodiment of the invention disclosed herein.
Figure 2B:
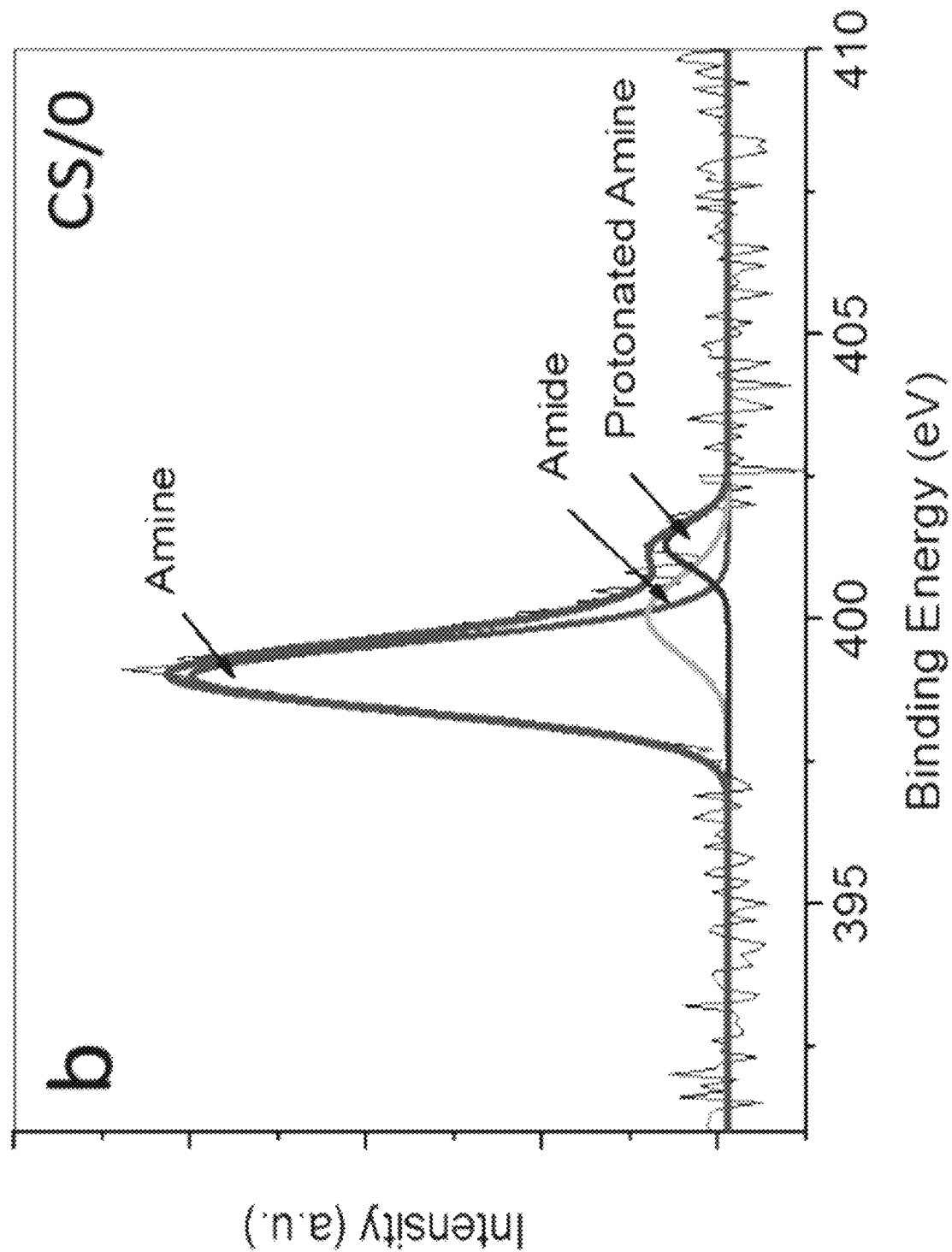
FIG. 2B is an XPS N is spectra of a CS/0 membrane in accordance with an illustrative embodiment of the invention disclosed herein.
Figure 2C:
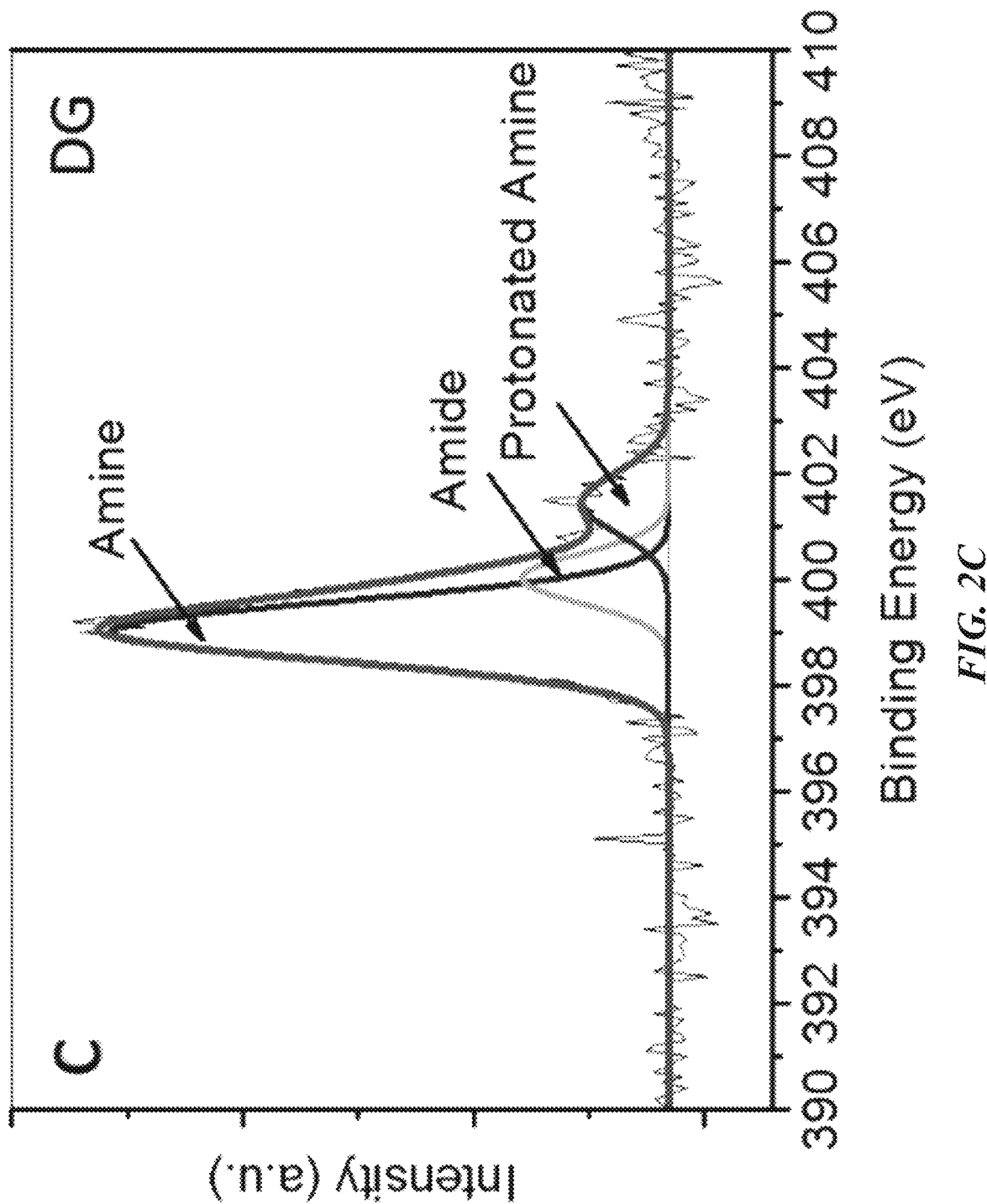
FIG. 2C is an XPS N is spectra of a DG-CSGO membrane in accordance with an illustrative embodiment of the invention disclosed herein.
Figure 7:
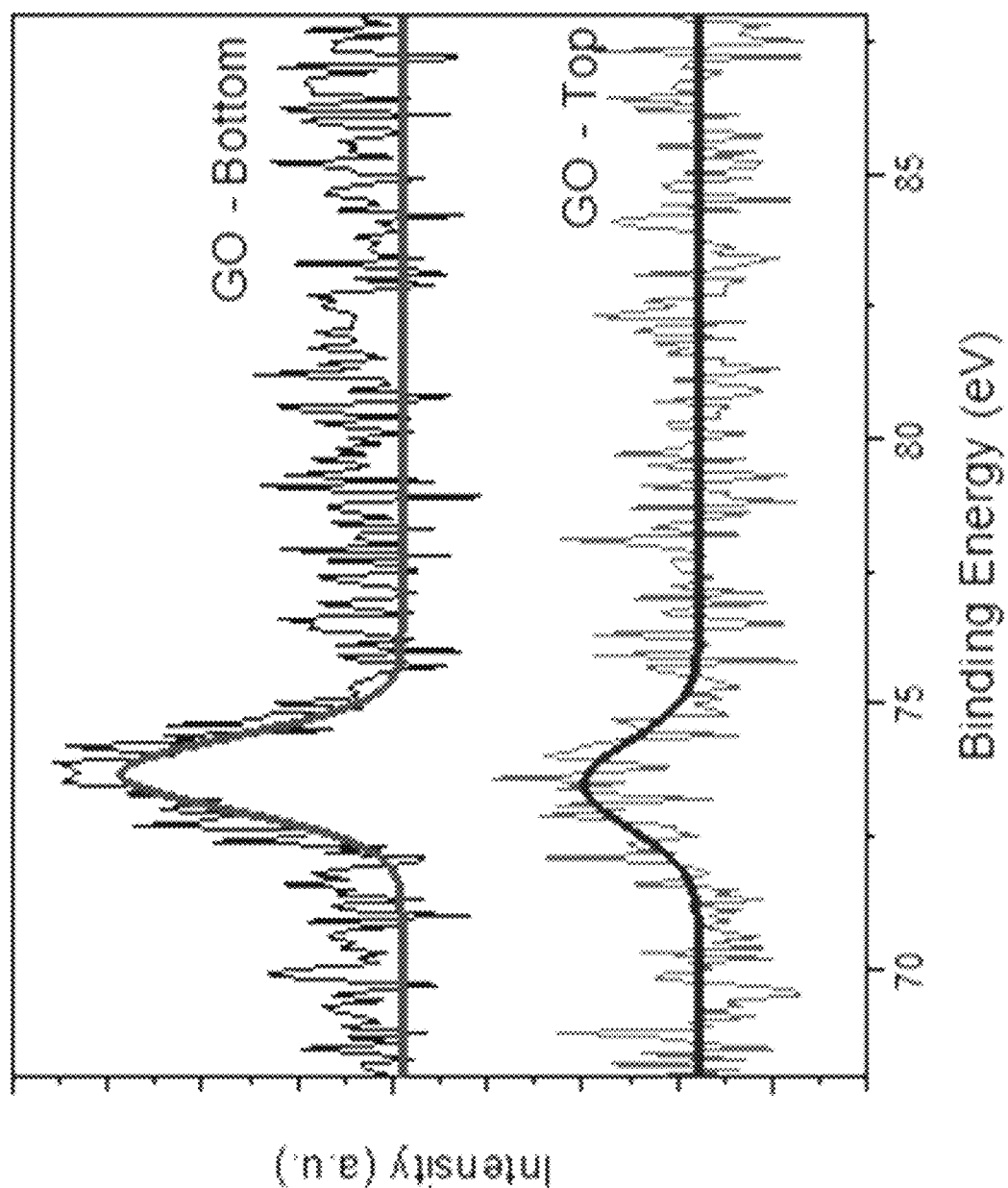
FIG. 7 is an XPS Al 2p spectra of bottom and top side of GO membrane in accordance with an illustrative embodiment of the invention disclosed herein.

Chemical Composition of CSGO Composite Membranes:

To assess the chemical composition of each membrane, all of the membrane samples were characterized by XPS (FIG. 2A-H). Initial survey scans were taken between 0 and 1400 eV binding energy for CS, GO, and CSGO films (survey scan of GO shown in FIG. 2A). The XPS survey scans were subsequently followed by detailed scans for carbon (C) (275-295 eV) for all the samples (FIG. 2E, F, G, H) and nitrogen (N) (390-410 eV) for the CSGO membranes and the CS/0 membrane (FIG. 2C, D, E). In addition, a detailed survey scan for Al (70-80 eV) was performed for the GO membrane (FIG. 7). The C is GO spectrum was analyzed for five types of C atom, where C is part of a covalent bond with another element (C, hydrogen (H), or oxygen (O)). Peaks assigned at 285.6, 286.8, 288, and 289.4 eV correspond to C—OH, C—O, C=O, and C(O)O groups, respectively. In addition, the first peak at 284.8 eV is a combination of C—C and C=C bonds. 41 The C—O peak represents epoxide groups typically found on the surface of GO. 40 Hydroxyl (C—OH), carboxyl (C(O)O) and carbonyl (C=O) peaks are also observed and are expected on the oxidized surface of GO. The dominant oxidized group is the epoxide group, and a significant C=C peak is also observed, illustrating the graphene-based honeycomb of carbon rings that is the backbone structure of GO. However, the C—C and C=C peaks are close to each other, and a smaller C=C peak is likely to be obscured by the large C—C peak, preventing a full analysis of C—C versus C=C bonding with XPS.

The C is XPS spectrum of the CS/0 membrane indicates the presence of C—C, C—O, and C=O groups at 284.8, 286.9, and 287.9 eV, respectively, while XPS results for both of the CSGO membranes indicate the presence of C=C/C—C, C—O, and C=O groups at 284.8, 286.9, and 287.9 eV, respectively. In comparison to the CS/0 membrane, the spectra for CSGO membranes result in a wider peak at around 284.7 eV indicating the presence of C=C, along with the characteristic peak at 284.8 eV for the C—C group. Further, the intensity of the peaks for C—O and C=O are larger due to the contribution of GO.

Figure 2D:
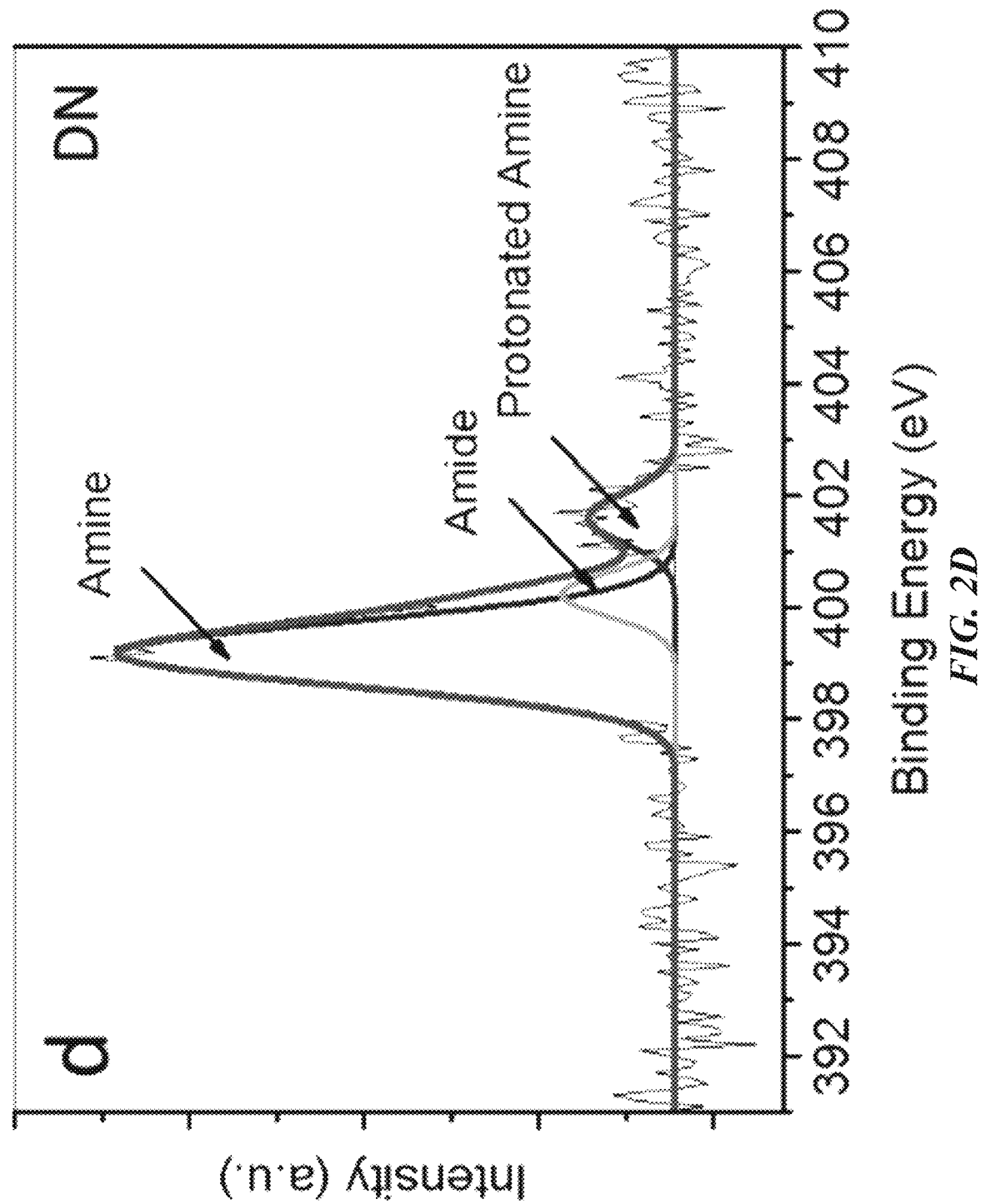
FIG. 2D is an XPS N is spectra of a DN-CSGO membrane in accordance with an illustrative embodiment of the invention disclosed herein.
Figure 2E:
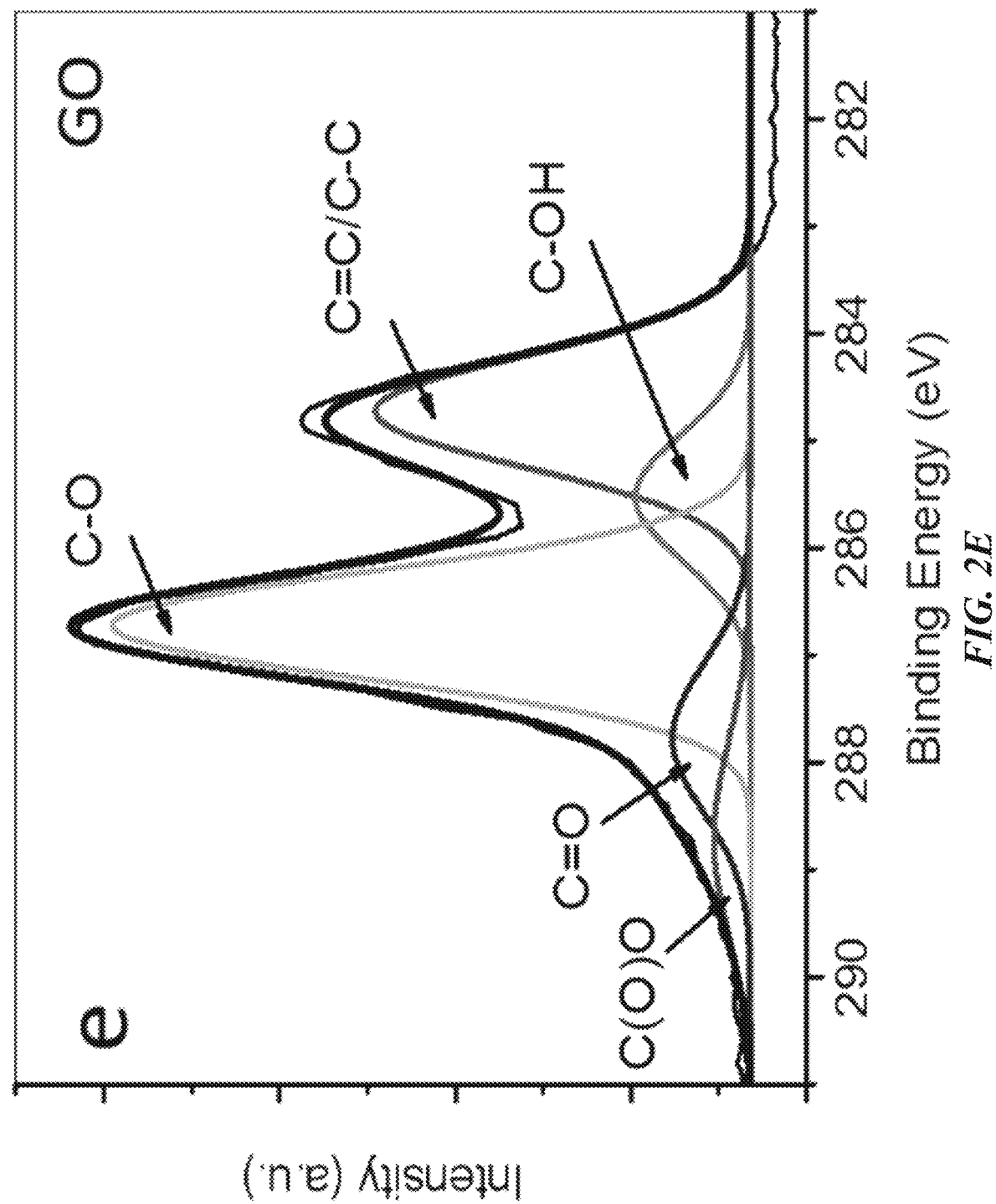
FIG. 2E is an XPS C is spectra of a GO membrane in accordance with an illustrative embodiment of the invention disclosed herein.
Figure 2F:
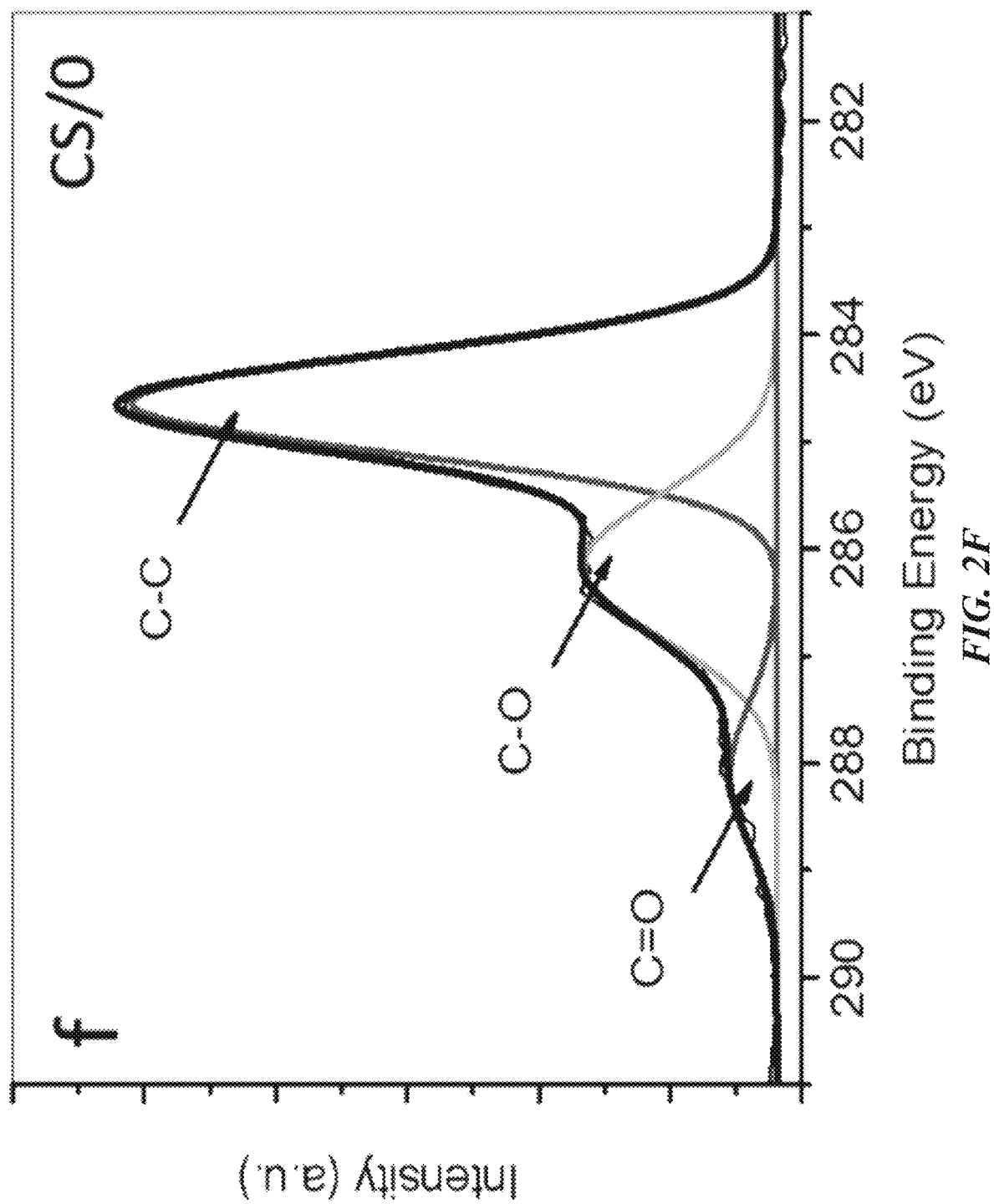
FIG. 2F is an XPS N is spectra of a CS/0 membrane with an illustrative embodiment of the invention disclosed herein.
Figure 2G:
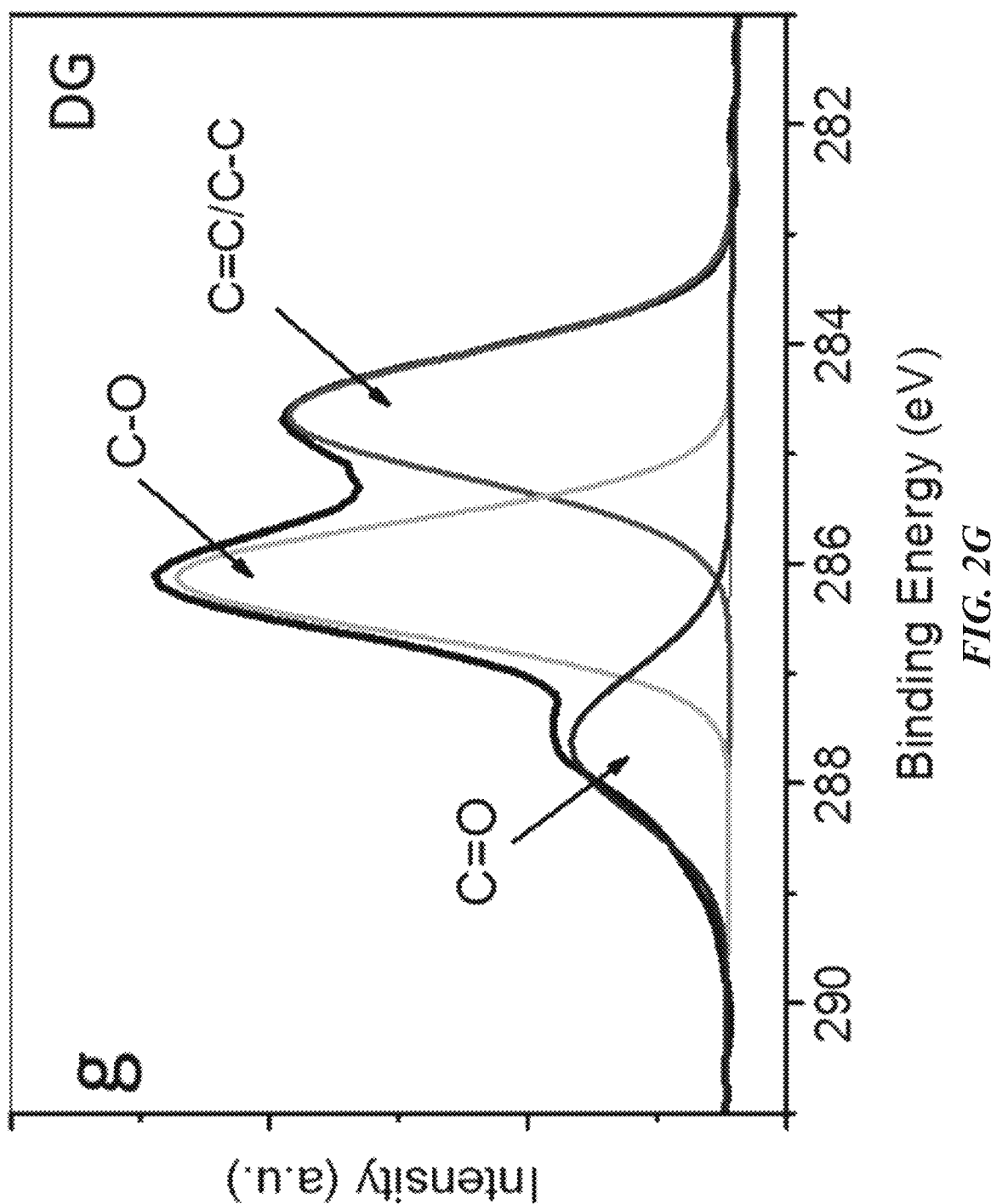
FIG. 2G is an XPS N is spectra of a DG-CSGO membrane in accordance with an illustrative embodiment of the invention disclosed herein.
Figure 2H:
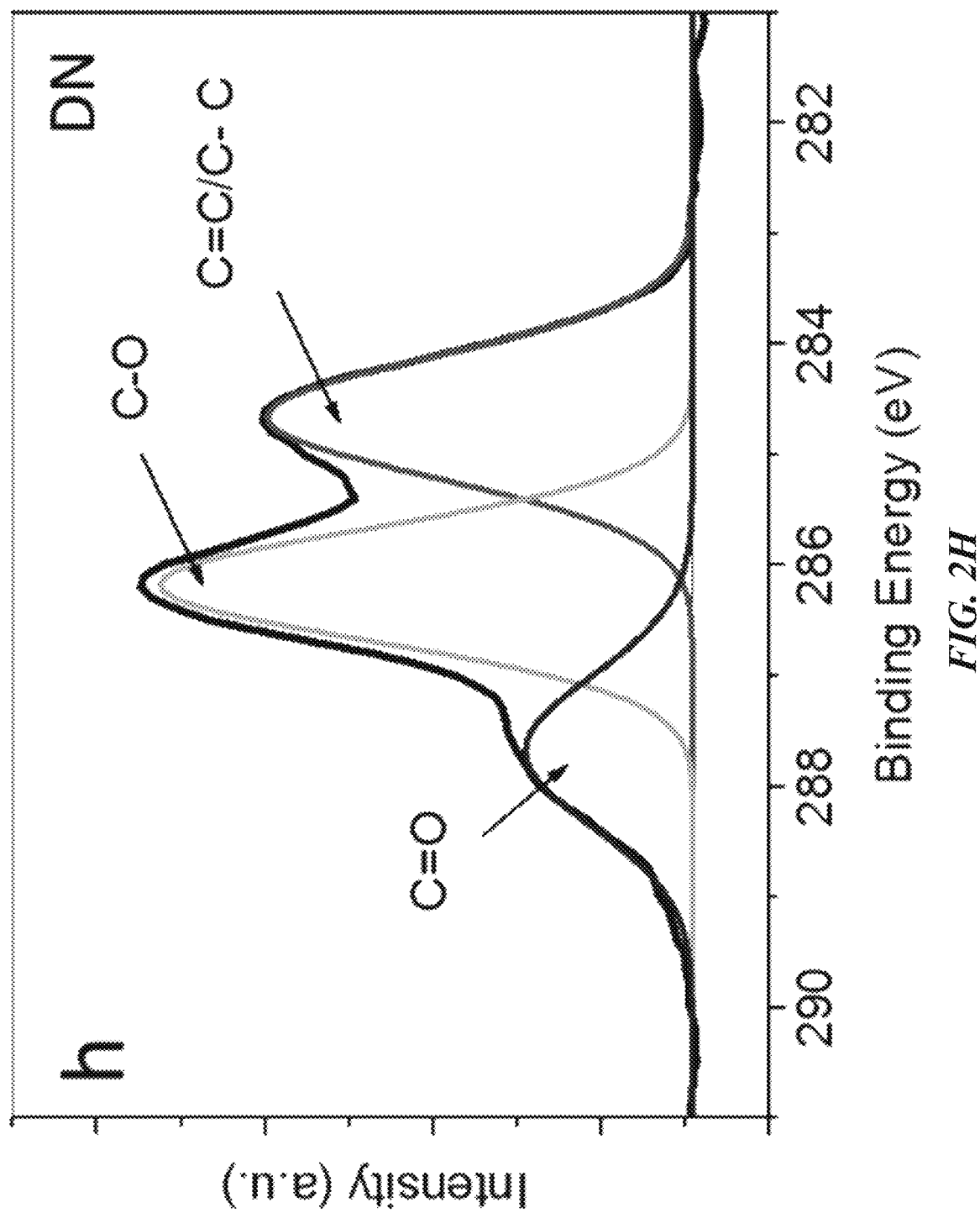
FIG. 2H is an XPS N is spectra of a DN-CSGO membrane in accordance with an illustrative embodiment of the invention disclosed herein.

The initial survey scans for the GO membrane resulted in no observed peaks in the N is region (FIG. 2A), as was expected, as GO by itself contains no nitrogen groups. The N is spectrum for the CS/0 membrane (FIG. 2B) resulted in three peaks that can be correlated to the amine (C—NH2), amide (C—NHC=O), and protonated amine species (C—NH3-+) at 399.4 (86.34%), 400.5 (9.56%), and 401.7 eV (4.10%), respectively. Results for the N is XPS spectra are shown in FIGS. 2C and 2D for the DG-CSGO and DN-CSGO membranes with no obvious difference between the two CSGO membranes. However, there are shifts in the peak intensities and related relative contributions to the N group speciation in CSGO membranes, as compared to the GO-free CS/0 membrane. The results, summarized in Table 1, indicate a reduction in amine group contribution from 86.34% for the CS/0 membrane to 80.68% and 83.50% for DG-CSGO and DN-CSGO membranes, respectively. Moreover, an increase in protonated amine species from 4.10% for the CS/0 membrane to 6.68% and 6.64% for DG-CSGO and DN-CSGO membranes, respectively, is observed. Amide species contribution also increased for DG-CSGO (12.64%) and, to a lesser extent, for DN-CSGO (9.86%) membranes, as compared to the CS/0 membrane (9.56%). The reduction in amine and increase in protonated amine and amide species is likely connected to electrostatic and hydrogen-bonding interactions that form between the N-based groups in CS and the oxidized functional groups on the GO surface. In particular, both hydroxyl and carboxyl groups on the GO surface could facilitate the formation of protonated amine groups between CS and GO, while carbonyl and epoxide groups could potentially participate in the formation of amide linkages through either electrostatic interactions or covalent bonds.

When the results for N-group speciation between the DG-CSGO membrane and the DN-CSGO membrane are compared, the granular GO particles appear to have a larger effect on speciation than the nanoscale GO particles. This result suggests that the size of the GO particles is not only important for controlling membrane morphology, as shown in FIG. 1, but is also important for controlling the interactions between the CS polymer and the GO particles in the composite membrane. The GO powder of each particle size was added at the same mass concentration to the CS solution to make the membranes. For the same mass, the larger, granular GO would have a larger ratio of top and bottom surface area to basal plane edges, as compared to the nanoscale GO, which would have more edge surface area on a per mass basis, given the smaller particle size. However, previous studies suggest that oxygen-containing functional groups are often located at the edges, with some portion of the functional groups on the surfaces. These results suggest that either the granular GO has more carboxyl and epoxide functional groups per unit mass or that the size of the granular GO is more amenable to the formation of amide linkages with the CS polymer molecules. The difference in observed N speciation between the two sizes of GO particles may also reflect differences in GO particle dispersion and aggregation within the CS matrix, where the lower amide speciation of DN-CSGO may indicate GO particle aggregation and a resulting decrease in accessible surface functional groups available for amide linkage. As a result, the DG-CSGO results in a greater number of interactions between GO and CS, represented by protonated amine and amide groups, than the DN-CSGO composite.

TABLE 1

Summary of N 1s and C 1s peak analysis for all four Membranes.

| Membrane | N1* (%) (399.4) | N2* (%) (400.5) | N3* (%) (401.7) | C/O Ratio |
|---|---|---|---|---|
| GO | — | — | — | 2 |
| CS/0 | 86.34 | 9.56 | 4.10 | 5 |
| DG-CSGO | 80.68 | 12.64 | 6.68 | 2.2 |
| DN-CSGO | 83.50 | 9.86 | 6.64 | 2.3 |

Figure 8:
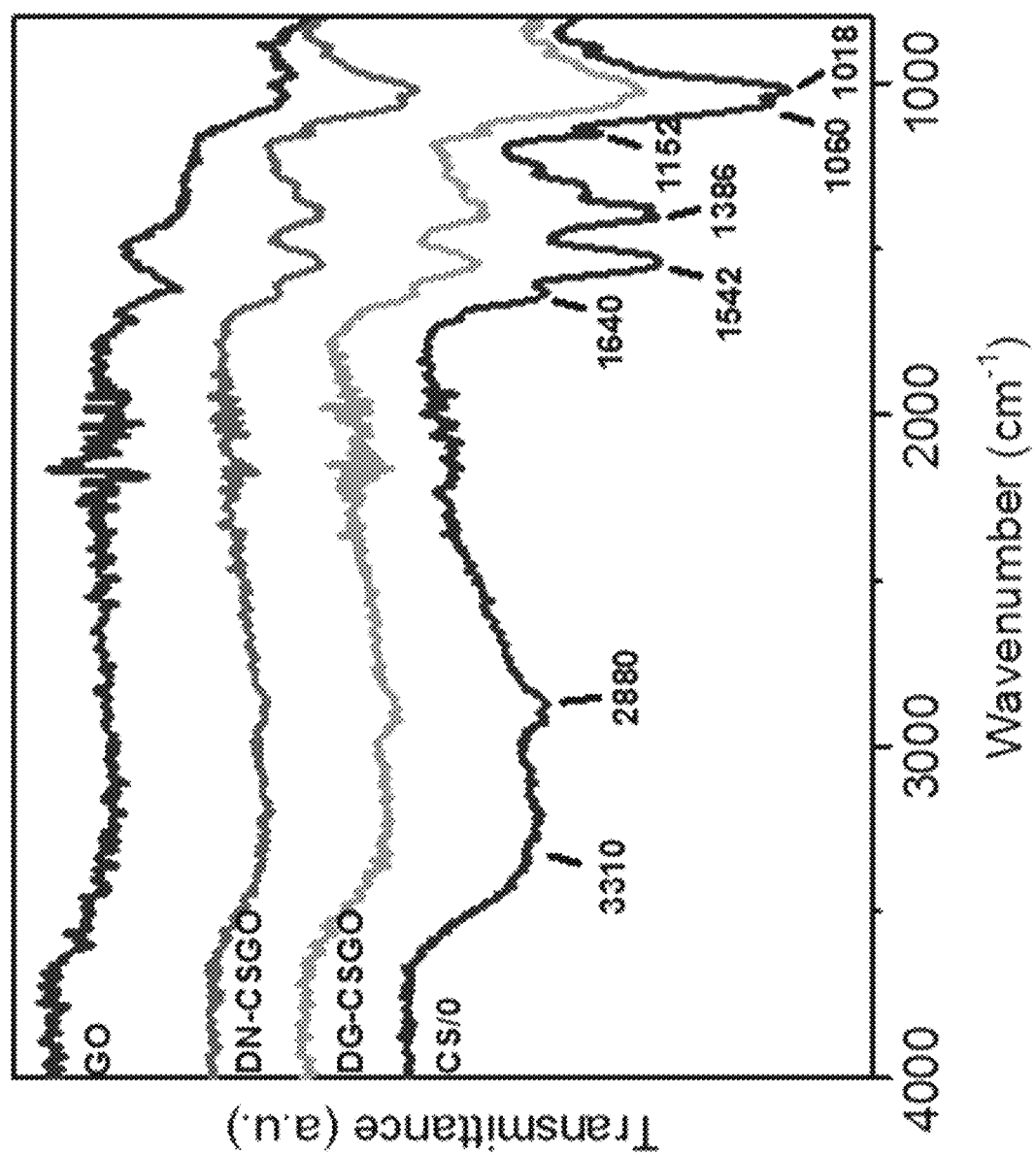
FIG. 8 is an FTIR spectra of CS/0, GO, DG-CSGO, and DN-CSGO membranes in accordance with an illustrative embodiment of the invention disclosed herein.

*N1, N2, and N3 are related to amine, amide and protonated amine species, respectively EDX was also used during SEM imaging for elemental analysis of the membranes and support results obtained by XPS (Table 3). FTIR was used as a bulk technique to distinguish chemical bonds present in all samples (FIG. 8). The FTIR results support the XPS results for both the C is and N is spectra but are not able to resolve the detailed differences identified with XPS.

Figure 3:
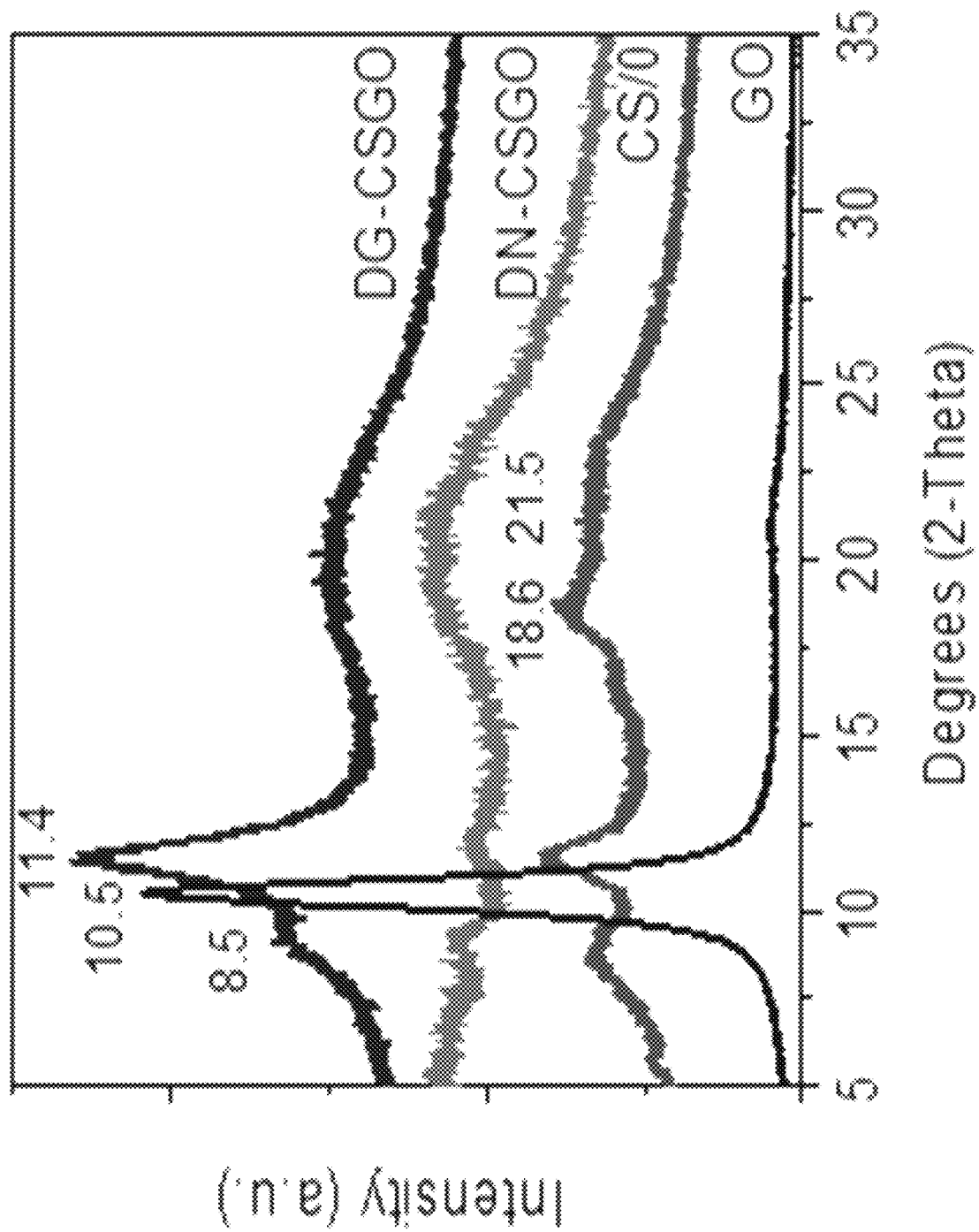
FIG. 3 is a graphical representation of XRD patterns of dry GO, CS/0, DN-CSGO and DG-CSGO membranes in accordance with an illustrative embodiment of the invention disclosed herein.

Structural Characterization of CSGO Composite Membranes:

XRD characterization (FIG. 3) of dry membrane samples was used to evaluate the crystallinity of each of the membranes, as well as the interlayer spacing of GO. The XRD pattern of GO shows a sharp peak at 10.50. The XRD pattern for the CS/0 membrane has two peaks at 8.50 and 11.4°, which are related to the hydrated crystalline structure, and two broad peaks at 18.60 and 21.5°, which are related to the amorphous structure of the CS film. In comparison to the GO membrane, both of the CSGO membranes result in the loss of the sharp peak at 10.50, the disappearance of which indicates exfoliation of GO into the CS matrix. The XRD diffraction patterns of the CSGO membranes also show the peaks that are related to CS at 21.5°, 18.6°, 11.4°, and 8.5°. However, the peaks at 18.60 and 21.5° result in significant broadening, suggesting an increase in structural disorder. While incorporation of granular GO particles increases the intensity of the peaks characteristic of CS, the addition of nanoscale GO particles decreases the intensity of these CS-related peaks at 11.4° and 8.5°. The increase in peak intensity of the DG-CSGO pattern at these two peaks suggests an increase in the degree of crystallinity after granular GO addition. However, the intensity reduction for the peak at 11.40 for the DN-CSGO film suggests that this membrane resulted in lower crystallinity after addition of the nanoscale GO particles to CS. The different results for the DG-CSGO and DN-CSGO membranes again suggest that GO particle size is in fact a critical parameter for controlling membrane properties, including not only morphology and chemical bonding, but also crystallinity. The higher crystallinity of the DG-CSGO is consistent with the layered, ordered cross-sectional morphology observed in FIG. 1, as compared to the more disordered, dispersed-particle morphology of the DN-CSGO membrane cross-section.

Figure 9A:
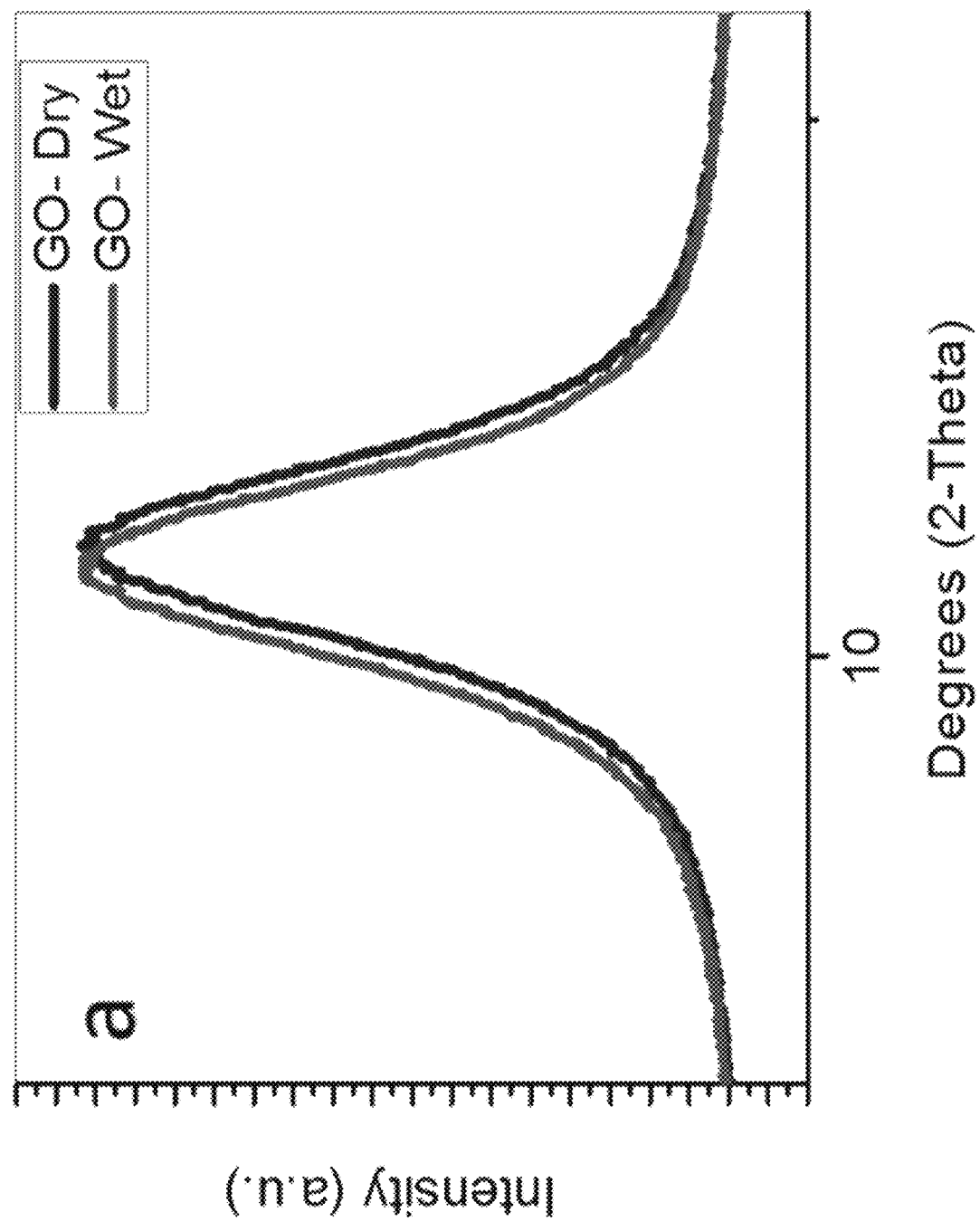
FIG. 9A is an XRD pattern of a GO membrane in wet and dry states in accordance with an illustrative embodiment of the invention disclosed herein.
Figure 9B:
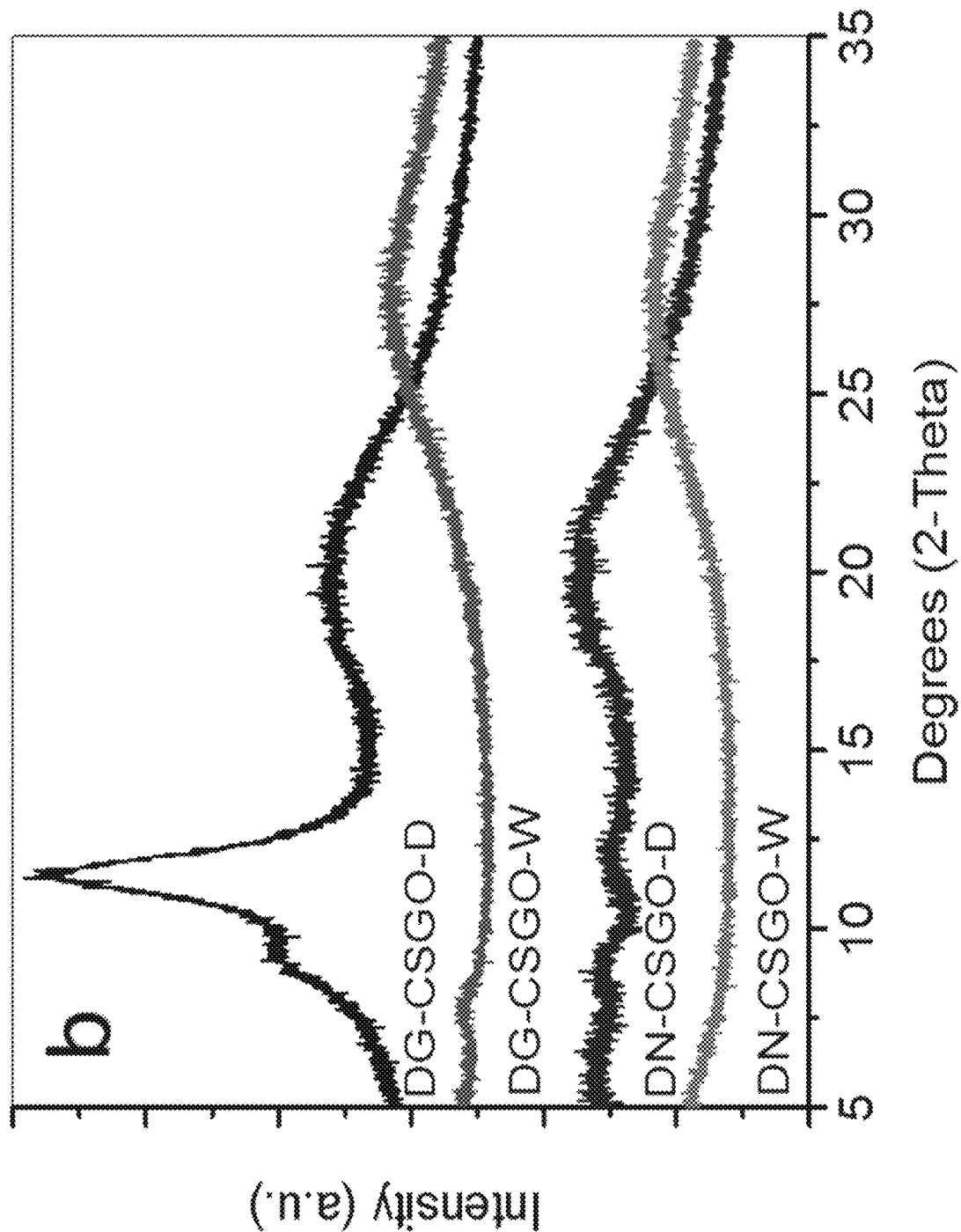
FIG. 9B is an XRD pattern of DG-CSGO and DN-CSGO membranes in wet and dry states in accordance with an illustrative embodiment of the invention disclosed herein

The behavior of the GO and CSGO membranes were also evaluated as wetted membranes by XRD. As shown in FIGS. 9A-9B, the peak of GO membrane is shifted to the left in the wet state due to increasing in interlayer spacing, while no sharp peak was observed for CSGO membranes in wet state because of losing the crystallinity.

Figure 4B:
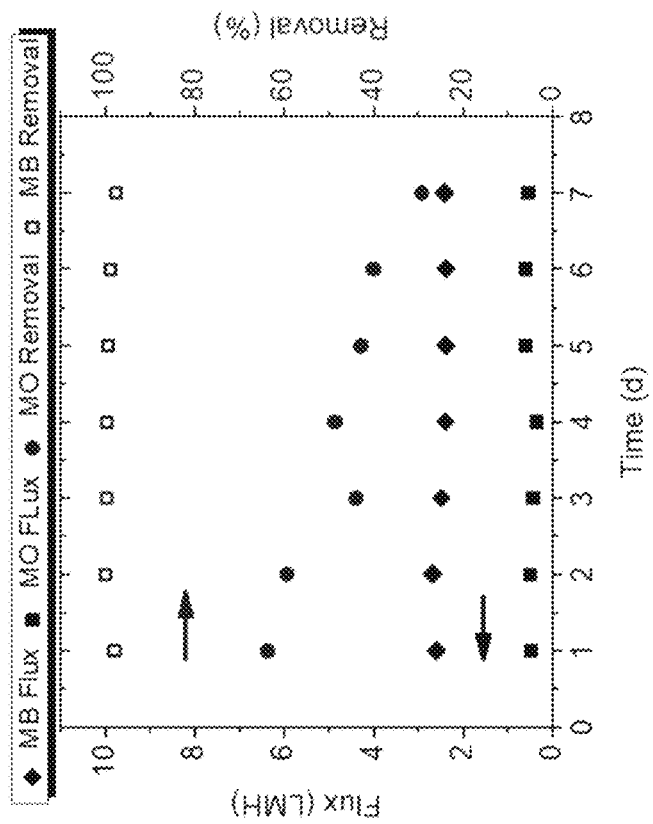
FIG. 4B is a graphical representation of water flux, MB, and MO removal for a DN-CSGO composite membrane, 10 mg/L constituent at 344 kPa (3.44 bar) and $1.8 \times 10^{-3}$ m/s cross-flow velocity, in accordance with an illustrative embodiment of the invention disclosed herein.
Figure 4A:
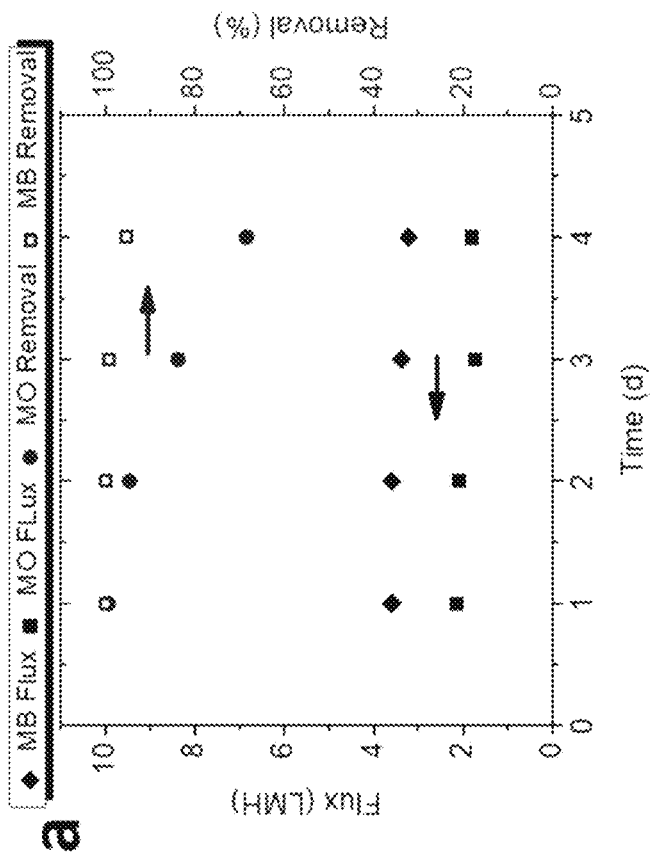
FIG. 4A is a graphical representation of water flux, MB, and MO removal for a DG-CSGO composite membrane, 10 mg/L constituent at 344 kPa (3.44 bar) and $1.8 \times 10^{-3}$ m/s cross-flow velocity, in accordance with an illustrative embodiment of the invention disclosed herein.
Figure 11:
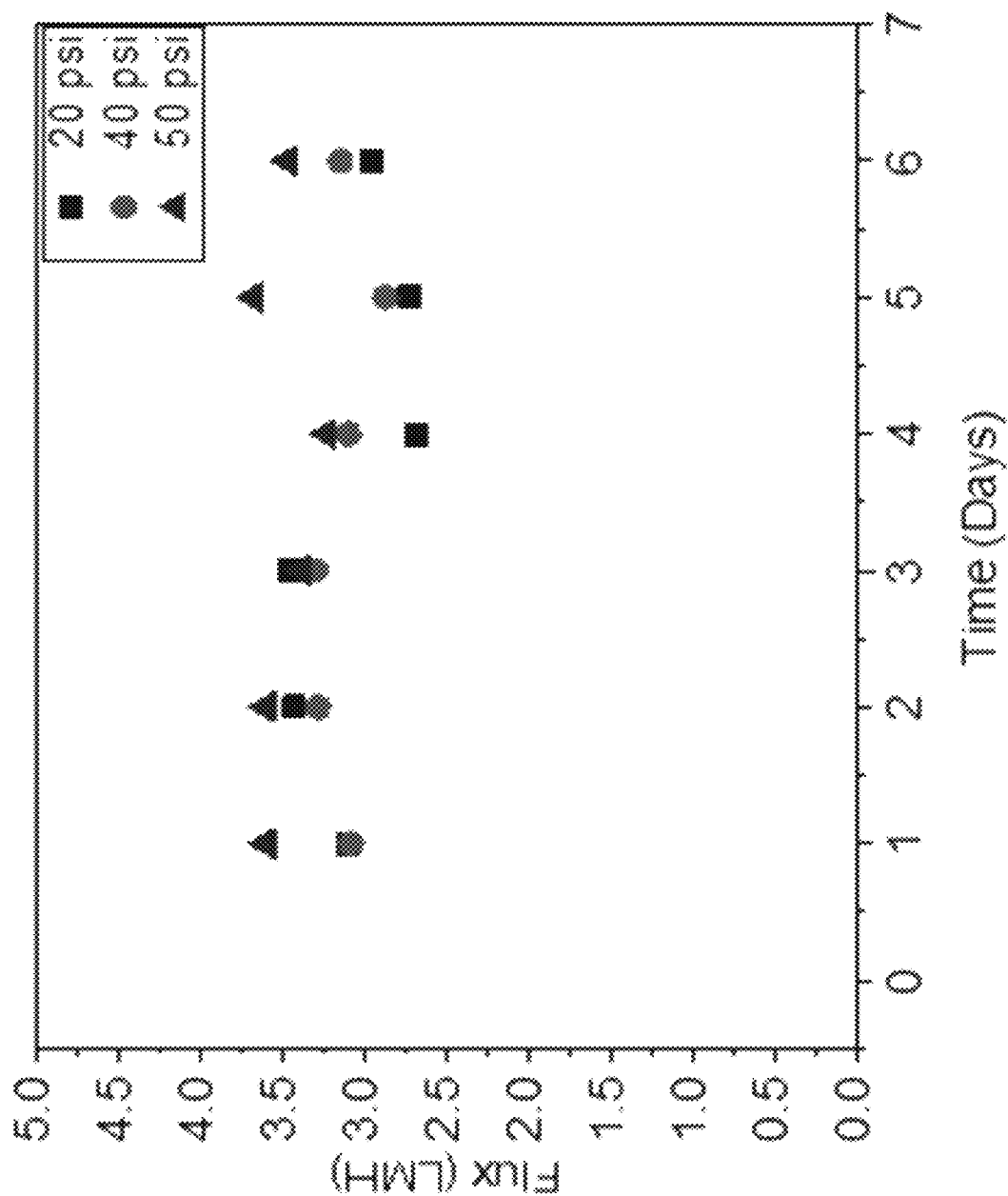
FIG. 11 is a graphical representation of pure water flux performance over time for a range of applied hydrostatic pressures, where membrane tested was a DG-CSGO membrane at a $1.8 \times 10^{-3}$ m/s cross-flow velocity in accordance with an illustrative embodiment of the invention disclosed herein.
Figure 12:
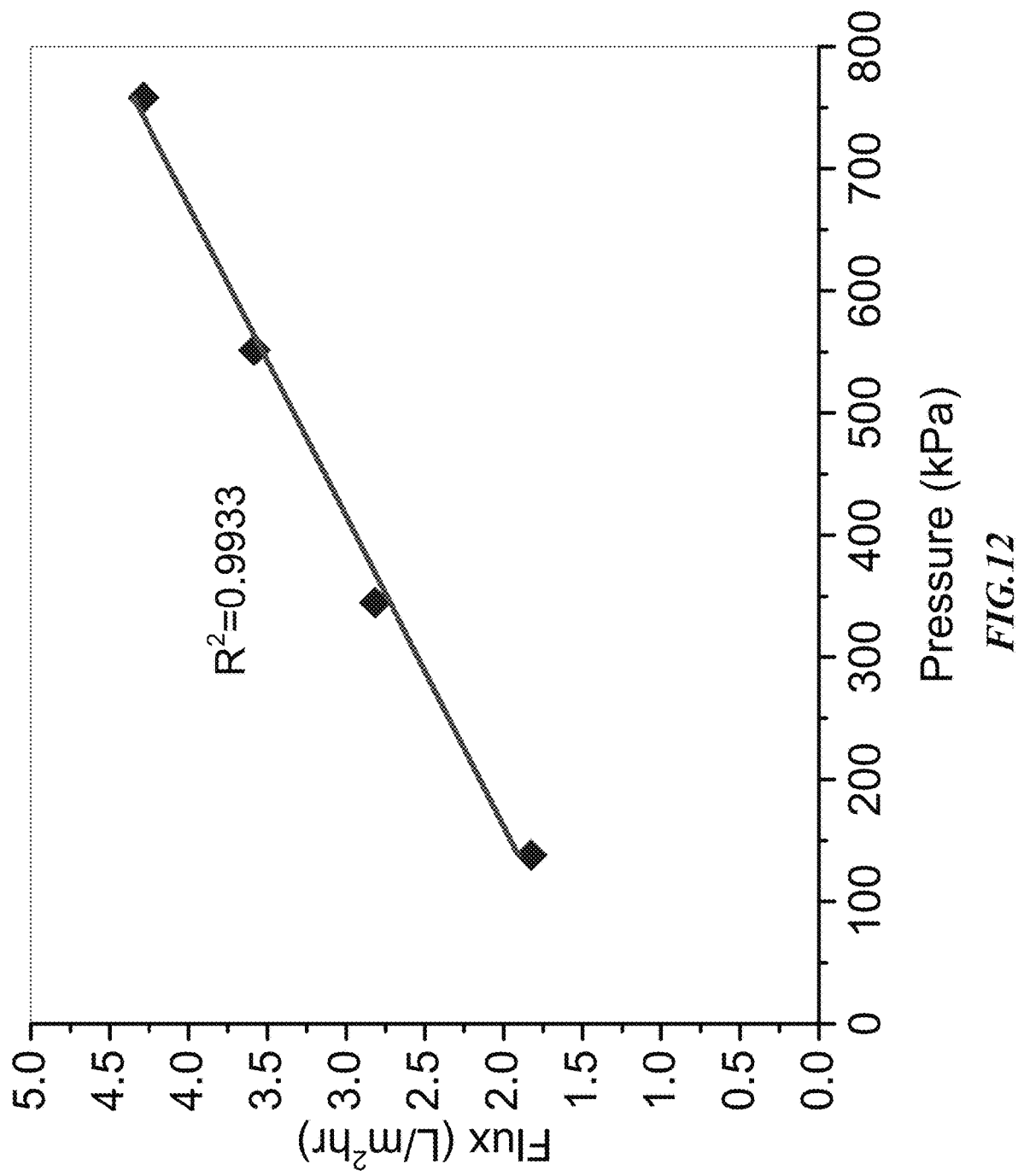
FIG. 12 is a graphical representation of flux versus pressure of DG-CSGO composite membrane in accordance with an illustrative embodiment of the invention disclosed herein.
Figure 13:
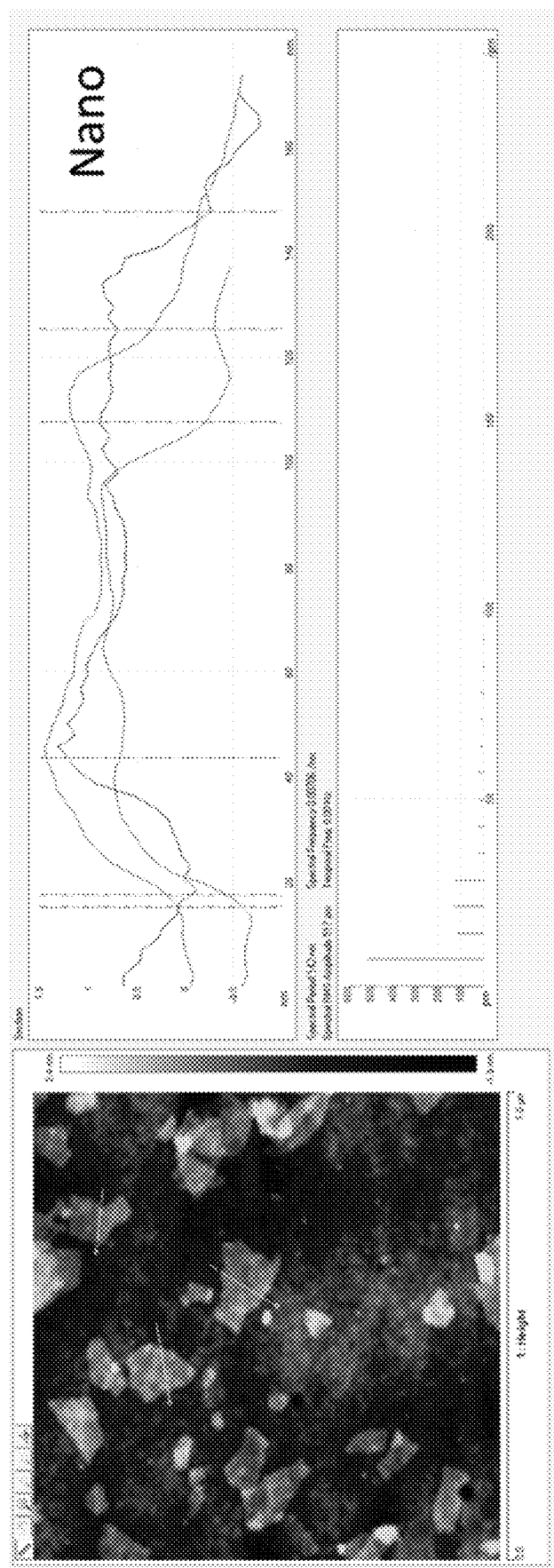
FIG. 13 is a tapping mode AFM image for single layer nanoscale GO particle on silicon wafer in accordance with an illustrative embodiment of the invention disclosed herein.
Figure 14:
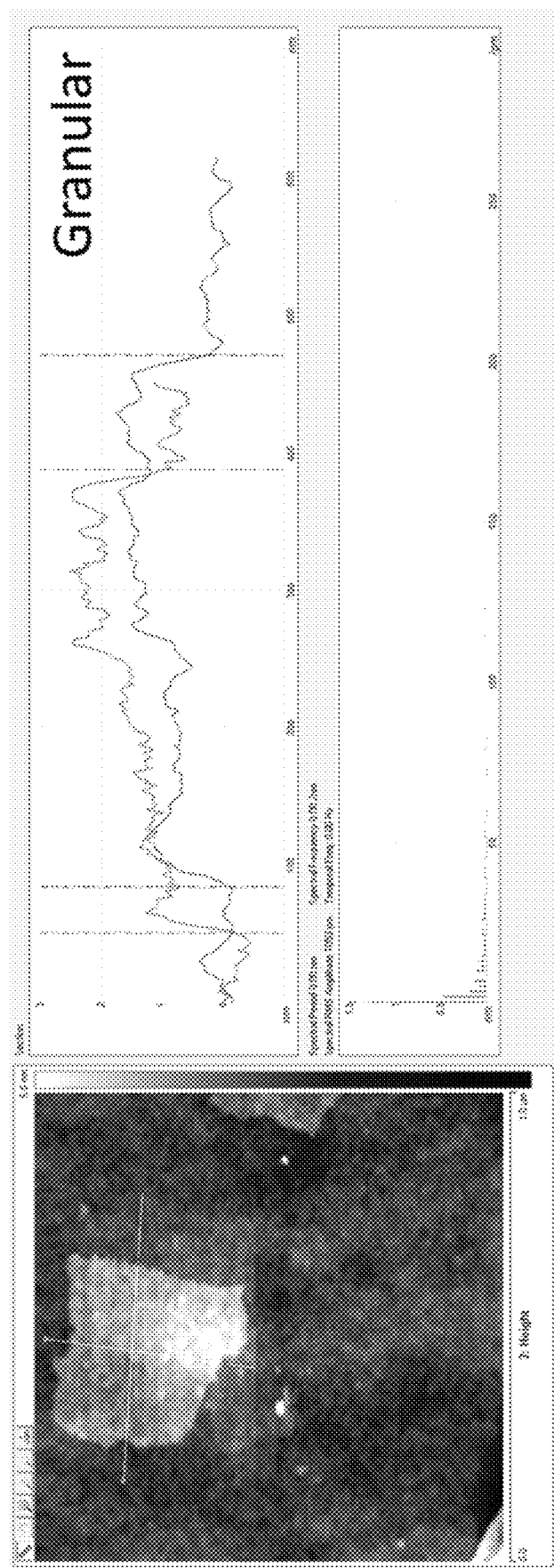
FIG. 14 is a tapping mode AFM image for single layer granular GO particle on silicon wafer in accordance with an illustrative embodiment of the invention disclosed herein.
Figure 15:
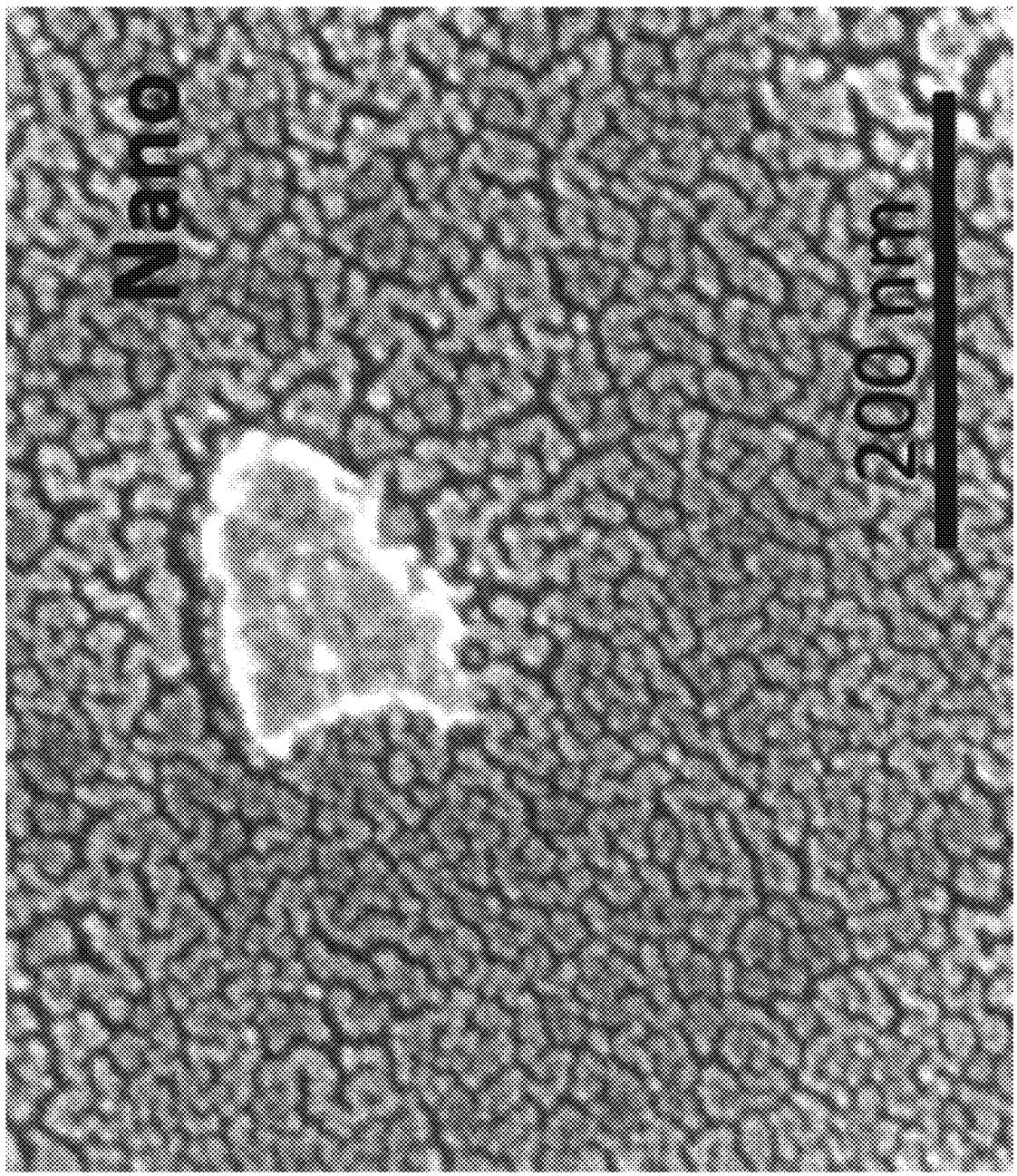
FIG. 15 is an SEM image for nanoscale GO particles in accordance with an illustrative embodiment of the invention disclosed herein.
Figure 16:
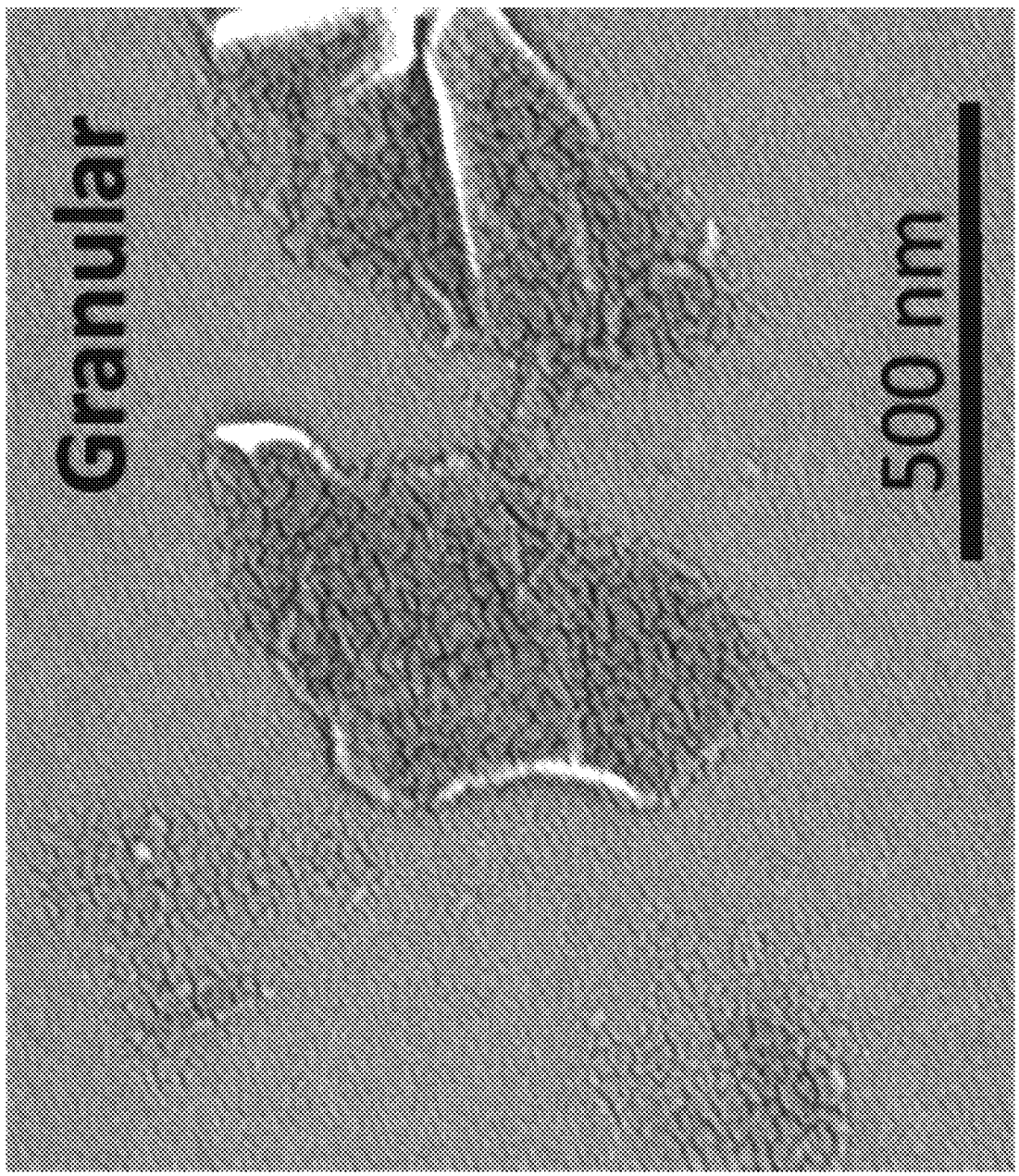
FIG. 16 is an SEM image for granular GO particles in accordance with an illustrative embodiment of the invention disclosed herein.
Figure 17:
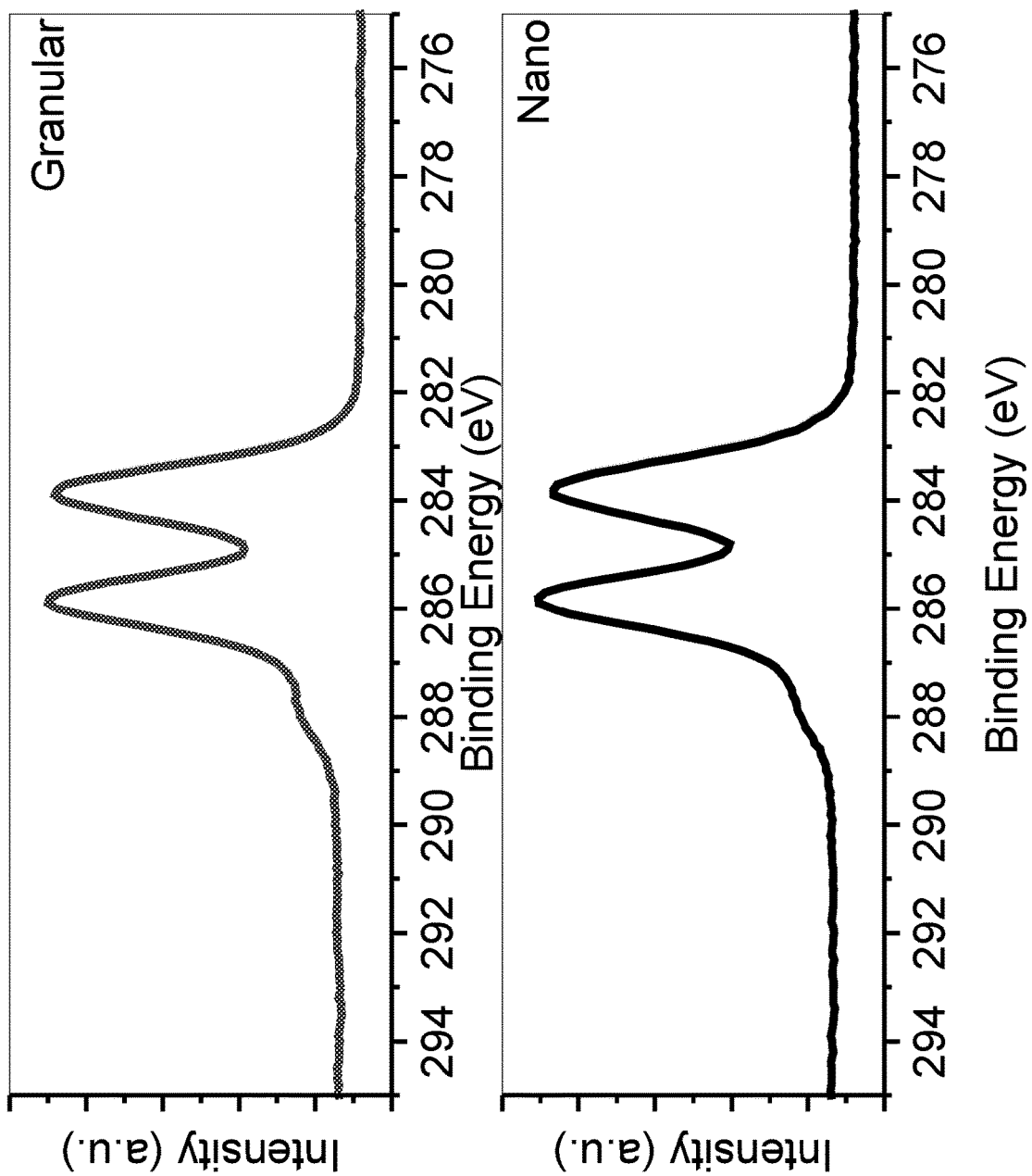
FIG. 17 is an XPS C is spectra of nanoscale GO particles in accordance with an illustrative embodiment of the invention disclosed herein.
Figure 18:
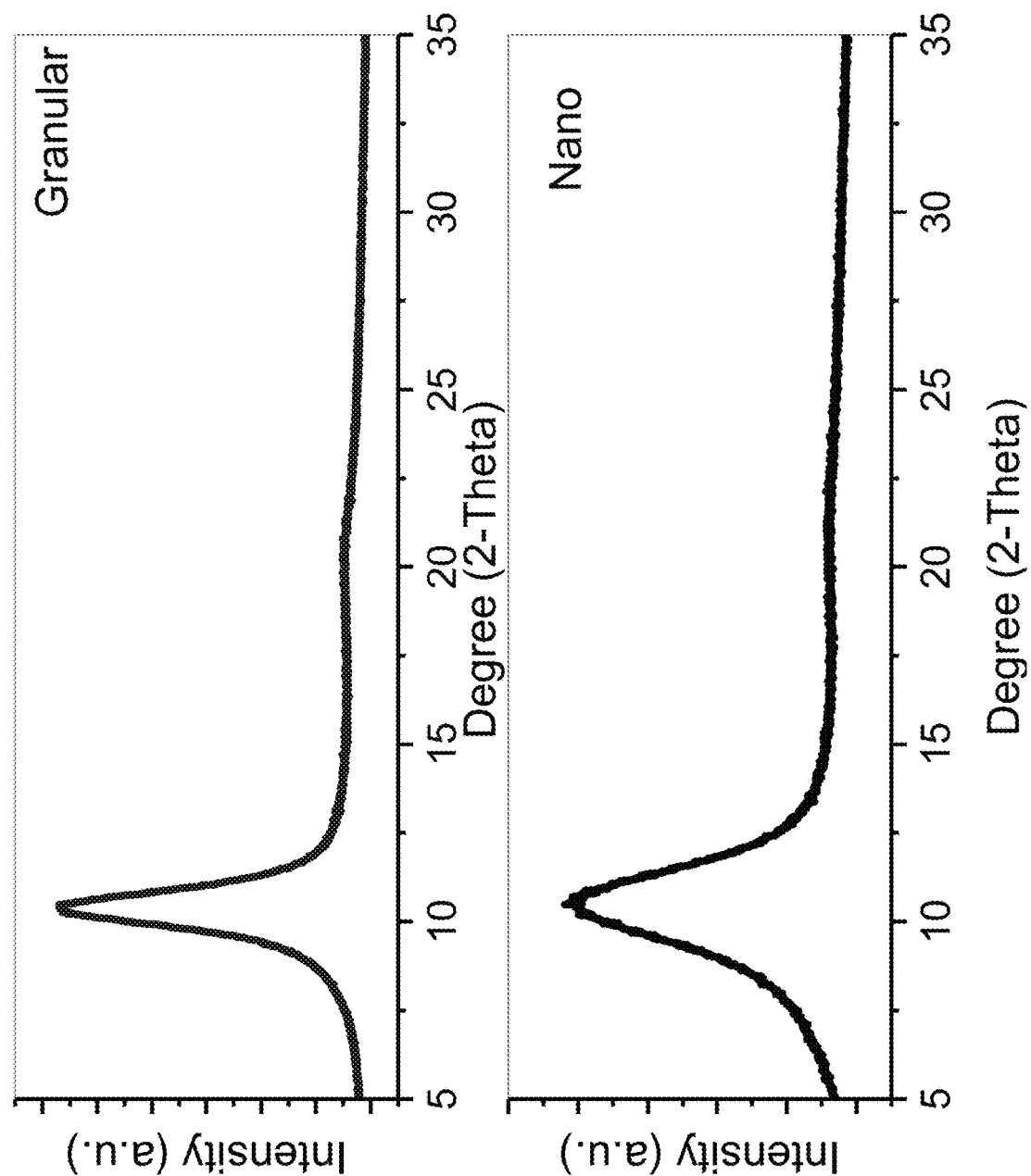
FIG. 18 is an XPS C is spectra of granular GO particles in accordance with an illustrative embodiment of the invention disclosed herein.

Membrane Performance: Pure Water Flux and Organic Dye Rejection:

The performance of DN-CSGO and DG-CSGO composite membranes were evaluated in a cross-flow cell and challenged with the cationic MB and anionic MO dyes. For MB, both composite CSGO membranes were able to remove greater than 95% of MB from solution at concentrations ranging from 1-100 mg/L. The flux rates for these solutions ranged from 2-4.5 L/m2-h with a transmembrane pressure of 344 kPa (3.44 bar) with pure water permeance ranging of 5.8×10-3-0.01 L/m2-h-kPa (0.58 to 1.3 L/m$^2$-h-bar) (FIG. 4). Both DN-CSGO and DG-CSGO membranes resulted in similar thicknesses (FIGS. 6A-6D). Based on the 41 m thickness obtained from SEM, the hydraulic permeability ranged from 0.24-0.54 L-m/m$^2$-h-kPa (24.4 to 54.1 L-μm/m$^2$-h-bar) (FIGS. 6A-6D). The tangential flow on the membrane surface had a cross-flow velocity of $1.8 \times 10^{-3}$ m/s and a Reynolds number of $6.3 \times 10^{-5}$. The rejection performance of DG-CSGO for MB was quite similar to that of DN-CSGO, with no observable or statistically significant difference in rejection performance between the two membranes. Further, the rejection performance of the two membranes remained consistent over the range of MB concentrations tested. The water flux decreased at higher MB concentrations for both membranes, and the water flux measured during MB rejection studies was similar to the measured pure water flux (FIG. 11). It is perhaps surprising that the membranes behave similarly despite the distinct differences in membrane morphology, structural order, and chemical composition. The similar performance observed may result from the swelling and loss of structural order that occurs in both of the membranes in the hydrated state (as observed in wet membrane XRD, FIG. 9B). The loss of order observed in the XRD results also suggests that the differences in nitrogen speciation observed by XPS (FIG. 2) are likely lost in the hydrated state, making the two composite membrane structures much more similar in the hydrated state than in the dry state.

In the case of anionic MO, results indicate the importance of electrostatic effects as sorption appears to be the dominant mechanism of removal with decreased performance over time. It is also noteworthy that in contrast to MB, GO particle size dependent performance was observed with micrometer-scale GO removing 68-99% and the nanometer-scale GO showing modest removal of 29-64%. As the CSGO composite membranes sorbed anionic MO dye, overall rejection efficiency diminished from 99% to 68% and from 64% to 29% for the DG-CSGO and DN-CSGO membranes, respectively, throughout the duration of evaluation, where rejection in this case includes both adsorption and physical sieving of the dye. Rejection was observed for the DG-CSGO as the adsorbent sites were occupied; the MO concentration within the concentrate stream initially decreased but then increased as the experiment continued. For the DN-CSGO, the concentration within the concentrate stream initially decreased and remained constant for the remainder of the experiment, indicating sorption without clear evidence of rejection. In addition to lower removal efficiency, the flux for MO was also lower than MB with a flux range from 0.5-2.1 L/m$^2$-h with a transmembrane pressure of 344 kPa (3.44 bar).

Further, while the water flux reported herein is quite low, membrane optimization (i.e., thickness and composition) will likely allow an increase in flux. It is also interesting to note that flux was not increased above the maximum of 4.5 L/m$^2$-h even when subjected to 4 different pressures between 1380 kPa-4140 kPa (13.8-41.4 bar). However, the permeance range of 0.6 to 1.3 L/m$^2$-h-bar is consistent with the permeance range of 0.5 to 10 L/m$^2$-h-bar for GO composites observed in the literature where GO is blended within another matrix. Despite the challenges presented for these composite membranes, the initial performance evaluation of MB rejection demonstrates that these membranes hold promise as a material that utilizes the advantageous properties of both CS and GO in a scalable film suitable for roll to roll (R2R) manufacturing. The difference in performance between the two dyes analyzed indicates that electrostatic effects, in part, dictate membrane performance. We anticipate this initial proof of concept using CSGO as a competent, scalable membrane for pressure-driven, cross-flow water treatment will serve to guide further optimization of GO mixed matrix membranes.

Of the four types of membranes fabricated, only the composite CSGO membranes were able to be tested in the cross-flow system. The CS/0 membrane was unstable in aqueous solution, as was expected for an unmodified CS/0 film due to the solubility of chitosan in aqueous solutions. The GO membrane, which was fabricated via the Anodisc-based method vacuum filtration method, was not scalable and did not have a surface area large enough to accommodate the cross-flow cell. The challenges of CS/0 stability and GO fabrication scalability are thus addressed in the formation of the CSGO composite membranes. The robust and scalable CSGO composite membranes were evaluated in the cross-flow system for up to 7 days and resulted in consistent pure water flux measurements. However, in longer flux studies, an increase in pure water flux was observed for some of the membrane samples tested, suggesting eventual instability of the composite in an aqueous system. This instability is likely due to swelling and loss of structural order; future work on these membranes will necessarily include optimization of membrane stability and evaluation of membrane performance in long-term cross-flow filtration studies.

In all experiments, formation of a concentrated MB solution in the reject stream of the cross-flow system (FIG. 5D) was indicative of physical rejection. However, both GO and CSGO composite materials are known to be excellent adsorbents for dyes and other contaminants. Thus to provide mechanistic insight and avoid attributing sorption to rejection, a mass balance on the MB was performed (Table 2) to demonstrate that the majority of the MB mass was rejected by the CSGO membranes, rather than adsorbed. In parallel, the adsorption capacity of GO and CSGO composite was evaluated. While GO was measured to adsorb MB with an adsorption capacity, Qe, of 139.29 mg/g, this sorption capacity is greatly diminished to a Qe of 52.40 mg/g for the CSGO composite. The reduction in adsorption capacity is likely due to the interaction between protonated amines of chitosan and oxygen functionalities of GO, which would reduce the number of available surface functional groups that are able to coordinate with MB molecules. This result, along with the mass balance calculations, indicates that as a CSGO composite, sorption is not expected to be a dominant factor, which is a benefit to a membrane separation. Conversely for MO, sorption appears to be the dominant mechanism, demonstrating the importance of electrostatic effects.

TABLE 2

Mass balance of MB dye in the feed, permeate, and concentrate for DG-CSGO membranes.

| Pressure (psi) | Feed (mg MB) | Permeate (mg MB) | Concentrate (mg MB) | MB Loss (mg) |
| --- | --- | --- | --- | --- |
| 20 | 66.8449 | 0.0017 | 65.8359 | 1.0072 |
| 50 | 63.7151 | 0.0018 | 64.5282 | 0* |
| 110 | 61.4986 | 0.0035 | 61.9195 | 0* |

*Concentrate stream contained greater mass of MB than feed, which indicates analytical error and no observable adsorption.

XPS Results:

In addition to the C 1s and N 1s spectra discussed above, the GO membrane was also analyzed for the Al 2p region (FIG. 7). Based on previously reported results, it was expected that the porous anodized aluminum oxide filter would release Al3+ during formation of the GO membrane, resulting in Al3+ cross-linked within the GO membrane. This incorporation of Al3+ into the GO membrane structure has been shown to be key to enabling membrane mechanical integrity where the membrane stiffness can be increased to 340% using AAO filters. It has also been suggested that the Al3+ concentration within the GO membrane may vary through the thickness of the membrane due to the location of the AOO filter on only the bottom side of the GO membrane during membrane fabrication. The XPS Al 2p spectra obtained for the top and bottom surfaces of the GO membrane are compared in FIG. 7, where the Al/C atomic ratio for the top and bottom surfaces of the GO membrane was ~1% and 2%, respectively. This result indicates Al3+ is present in all the layers throughout the thickness of the GO membrane but that the concentration of Al3+ increases from the top to the bottom of the membrane. The measured Al/C ratios were different because the bottom layers of the GO membrane were in contact with the AAO filter more than the top layers during the 72 h filtration. If a general mechanism of diffusion is assumed for Al3+ incorporation into the GO membrane, where Al3+ dissolution from the AAO filter and through the GO membrane is slow compared to the overall membrane fabrication time, a concentration gradient of Al3+ through the membrane would exist. This concentration gradient would thus result in a measured decrease in Al3+ concentration from the bottom to the top of the fabricated membrane.

EDX Results:

As EDX is considered to be semi-quantitative, EDX results are used to support results obtained by XPS and are used as relative measurements within the sample set of membranes reported herein, rather than quantitative, absolute measurements. The GO membrane sample contained 60.8% carbon and 38.0% oxygen, which are correlated to the carbon ring backbone and oxygen-containing functional groups of the membrane. The 0.5% sulfur in the GO sample is likely due to the residual sulfur from $H_2SO_4$ used in GO preparation from graphene. The Al3+ released from the AAO filter was also observed in the GO membrane. In comparison with the top side of the GO, the bottom side shows approximately the same amount of C, O, and S; this result is expected since EDX is a bulk characterization technique, whereas XPS is a surface sensitive technique, probing only the first 5-10 nm of the membrane sample. The EDX results for the CS/0 membrane indicate an atomic distribution of 62.0% as C, 27.5% as O, and 10.6% as N in the membrane. The CSGO membranes also show ~8% N because of the amine groups of CS. Overall, the EDX results confirm and support results presented in FIG. 7 and Table 3 for XPS analysis.

TABLE 3

EDX results of the four membrane samples.

| Element | GO Top (%) | GO Bottom (%) | DG-CSGO (%) | DN-CSGO (%) | CS/0 (%) |
| --- | --- | --- | --- | --- | --- |
| C | 60.8 | 59.2 | 51.9 | 53.4 | 62.0 |
| O | 38.0 | 39.1 | 39.7 | 38.7 | 27.5 |
| N | 0 | 0 | 8.1 | 7.9 | 10.6 |
| S | 0.5 | 0.5 | 0 | 0 | 0 |
| Al | 0.7 | 1.2 | 0 | 0 | 0 |

FTIR Results:

The presence of amide I and amide II bands are shown in the IR spectrum of the CS/0 membrane with two peaks at 1640 and 1542 $cm^{-1}$, respectively. The peaks at 1018 and 1152 $cm^{-1}$ confirm the presence of primary ($C_6$—OH) and secondary ($C_3$—OH) alcoholic groups, respectively. Broad peaks in the range of 2500 to 3500 $cm^{-1}$ indicate N—H (amino group) and O—H stretching. The FTIR spectrum of the GO membrane also consists of several peaks. The four main peaks at 985, 1085, 1618, 1722 $cm^{-1}$ are related to C—O—C bonds of epoxy, C—OH, C=C stretching mode of the sp2 carbon skeletal network, and C=O bonds, respectively. The spectrum for CSGO samples shows that typical peaks of the functional groups presented in the CS/0 membrane are also observed in the CSGO composite membranes. The peaks at around 1648 $cm^{-1}$ and 1550 $cm^{-1}$ correspond to C=O and N—H stretching. The intensity of the peaks decreases in the CSGO spectra, in comparison with pure CS. Moreover, some of the peaks, such as the amide group C=O bond, are shifted. The interaction of negative charge on GO surface and polycationic CS, as well as hydrogen bonding, may be responsible for these changes.

The broad peaks in the range of 2500 to 3500 cm$^{-1}$ are associated with the OH groups in GO and amine stretch from the CSGO mixture.

XRD Results:

For this set of measurements, the membranes were soaked in purified water for 30 min and then analyzed by XRD. The resulting XRD diffraction patterns are compared for both the dry and wet states in FIG. 8. The characteristic XRD peak of synthesized GO is located at 2θ=10.54° in the dry membrane in FIG. 9A. The Bragg equation was used to obtain a d-spacing of 8.38 Å for the dry membrane. This diffraction peak for GO shifted slightly to the left in the wet state, which demonstrates a slight increase in interlayer spacing of the GO membrane upon wetting; the intensity of the diffraction peak remained the same. The d-spacing of the wet membrane was calculated as 8.52 Å for 2θ=10.37°. In stark contrast to the GO membrane, the diffraction peaks for both of the CSGO membranes disappeared in the wetted state, indicating a complete loss of crystallinity and structural order upon wetting. As expected, the Al3+ cross-linked GO, which was shown by XPS and EDX to contain a small amount of Al, retains the lamellar structure of the GO membrane once wetted. In the composite CSGO membranes, the loss of peaks suggests that the interactions between CS and GO were based on electrostatic and hydrogen bonding and that these interactions are not strong enough to retain the crystalline structure and order of the dry membrane once wetted. This result is likely to have implications for the long-term stability of the composite CSGO membranes during water filtration.

Figure 10:
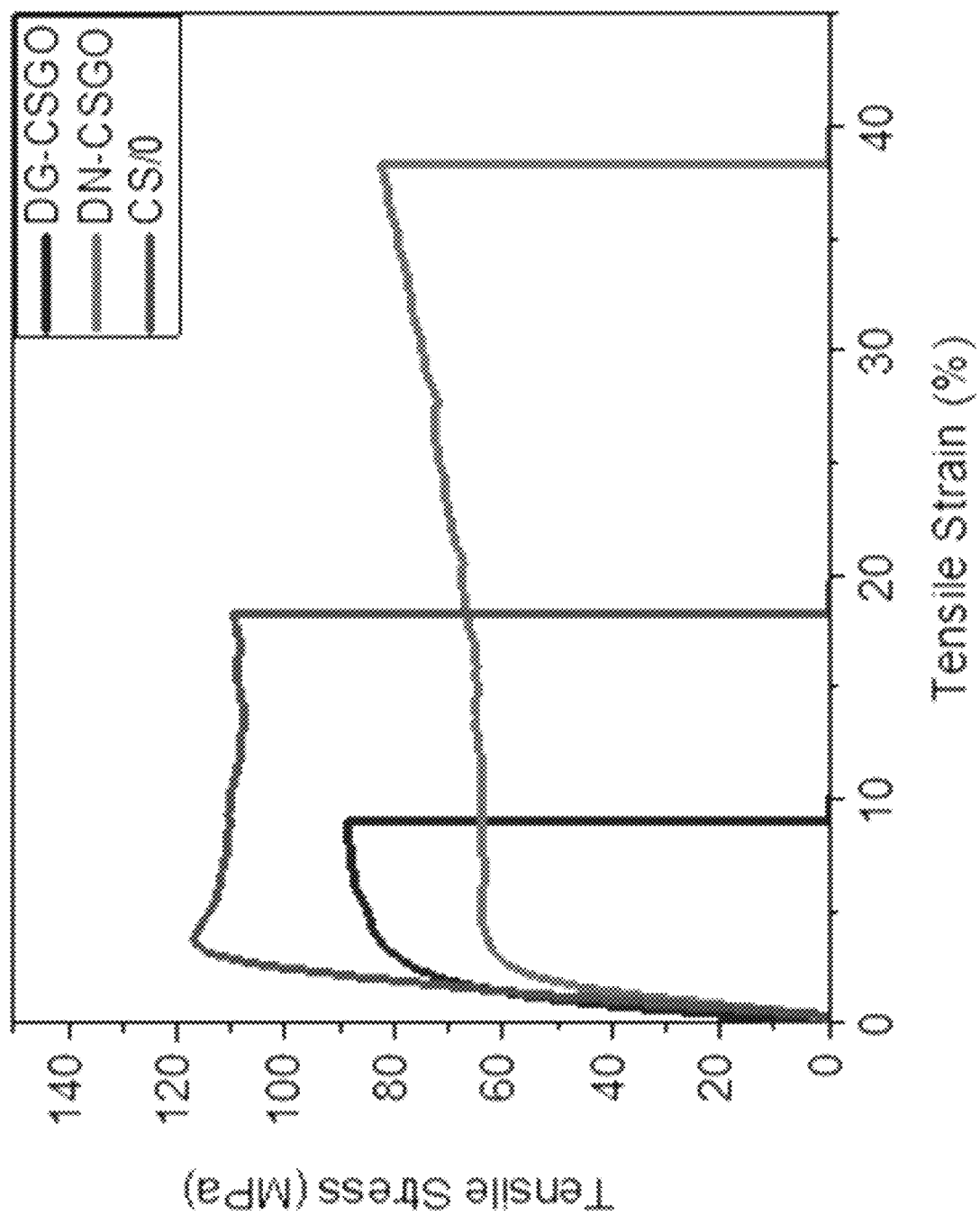
FIG. 10 is a graphical representation of stress-strain curves of CS/0, DG-CSGO, and DN-CSGO membranes in accordance with an illustrative embodiment of the invention disclosed herein.

Tensile Test Results:

Tensile testing (FIG. 10) was used to study the mechanical behavior of the CS/0 and CSGO membranes. Good dispersion of GO particles into the CS matrix lead to proper load transfer from CS matrix to GO sheets. The mechanical properties of the composite increase because of the large aspect ratio of the GO sheets and also load transferring from CS matrix to GO sheets. While at the low GO content (less than 6%) in CS matrix a good dispersion of GO particles and then improving the mechanical properties of the composites is observed, further increasing the GO content result in aggregation and defects at the composites and so tensile strength would be decreased. Good dispersion and mechanical properties is achieved at high level of GO particles into the CS. The DG- and DN-CSGO composites contain 17% GO were tested. While the Young's modulus of the CSGO membranes is approximately same as the CS/0, the ultimate tensile stress for CSGO membranes is less than CS/0, which may be a result of the high GO content. It is apparent in FIG. 9A-9B that the CSGO composite with nanoscale GO particles has larger elongation at the break point in comparison with CS/0. DG-CSGO composite has different behavior from DN-CSGO. The elongation of DG-CSGO membrane is not only lower that DN-CSGO but also lower than CS/0. The presence of defects and displacement of the DG particles in loading may be the reason for low elongation at the break point for this membrane.

As demonstrated above, the size of the GO particles has a significant influence on the surface and cross-sectional morphology of the CSGO composite and also influences the chemical composition and interactions between CS and GO in the composite. The size of the GO particles, however, is not related to the membrane performance for water treatment of cationic dye. Adding nanoscale GO particles causes better dispersion and less defects than granular particles, so longer elongation at the break point.

Therefore, the size of the graphene oxide particles in the chitosan-graphene oxide composite membranes is shown to have a direct impact on the membrane morphology, chemical speciation, structure order, and membrane mechanical properties. The composite membranes comprised of either nanometer GO or micrometer-scale GO result in similar filtration performance when pure water flux and rejection of the cationic dye methylene blue. However, the differences in rejection and flux observed during filtration of anionic dye methyl orange suggest the size of GO may impact filtration performance and that the properties of the contaminant are important to understand in relation to the properties of the composite membranes. Overall, the CSGO membranes had rejections of at least 95% for cationic methylene blue (MB) with mass balances obtained from measurements of the feed, concentrate, and permeate. This result demonstrates the dominant mechanism of removal is physical rejection for both GO particle sizes. For anionic methyl orange (MO), results indicate sorption as the dominant mechanism of removal, and performance is dependent on both GO particle size and time, with micrometer-scale GO removing 68-99% and nanometer-scale GO showing modest removal of 29-64%. The pure water flux for CSGO composite membranes ranged from 2-4.5 L/m$^2$-h at a transmembrane pressure of 344 kPa (3.44 bar) with pure water permeance ranging of 5.8×10-3-0.01 L/m$^2$-h-kPa (0.58 to 1.3 L/m$^2$-h-bar).

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the disclosure may be implemented by performing or completing manually, automatically, or a combination thereof, selected steps or tasks.

The term "process" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a process comprising two or more defined steps, the defined steps can be carried out in any order or simultaneously (except where context excludes that possibility), and the process can also include one or more other steps which are carried out before any of the defined steps, between two of the defined steps, or after all of the defined steps (except where context excludes that possibility).

Still further, additional aspects of the invention may be found in one or more appendices attached hereto and/or filed herewith, the disclosures of which are incorporated herein by reference as if fully set out at this point.

Thus, the invention is well adapted to carry out the objects and attain the ends and advantages mentioned above as well as those inherent therein. While the inventive concept has been described and illustrated herein by reference to certain illustrative embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A process for making a chitosan-graphene oxide composite membrane, said process comprising the steps of:
   selectively mixing graphene oxide with purified water, wherein said graphene oxide has a first flake size between about 80 nm and about 105 nm in diameter or a second flake size between about 0.3 µm and about 0.7 µm in diameter, wherein said first flake size produces said chitosan-graphene oxide composite membrane with a layered graphene oxide internal morphology structure and said second flake size produces said chitosan-graphene oxide composite membrane with a dispersed graphene oxide internal morphology structure;
   mixing chitosan with an acid;
   preparing a casting solution comprising said chitosan and said graphene oxide;
   evaporating said casting solution under reduced pressure to make said chitosan-graphene oxide composite membrane having said layered or said dispersed internal morphology structure.

2. The process of claim 1 wherein said step of preparing said casting solution further comprises the step of mixing said graphene oxide and said chitosan to form a homogenous mixture.

3. The process of claim 1 wherein said acid is acetic acid, malic, succinic acid, glycolic acid, oxalic acid, adipic acid, citric acid, formic acid, carboxylic acid, sulfonic acid, muriatic acid, tannic acid or a combination thereof.

4. The process of claim 1 wherein said membrane is a scalable chitosan-graphene oxide composite membrane.

5. The process of claim 1 wherein said membrane is a flat sheet chitosan-graphene oxide composite membrane.

6. The process of claim 5 further comprise the step of preparing a spiral wound chitosan-graphene oxide composite membrane from said flat sheet chitosan-graphene oxide composite membrane.

7. The process of claim 1 wherein said casting solution comprises up to about 25% by weight graphene oxide and up to about 75% by weight chitosan.

8. The process of claim 1 wherein a ratio of said chitosan to said graphene oxide is between about 4:1 and about 6:1 w/w.

9. The process of claim 8 wherein said ratio of said chitosan to said graphene oxide is about 5:1 w/w.

10. The process of claim 1 further comprising between about 16% and about 25% by weight graphene oxide.

11. The process of claim 1 further comprising the step of physically confining the chitosan-graphene oxide composite membrane between microfiltration membranes.

12. The process of claim 11 wherein said microfiltration membranes are nitrocellulose microfiltration membranes.

13. The method of claim 1 further comprising the step of selectively controlling and/or adjusting liquid filtration and sorption performance of said chitosan-graphene oxide composite membrane based on said first flake size or said second flake size of said graphene oxide.

14. The method of claim 1 further comprising the step of selectively controlling and/or adjusting a crystallinity of said chitosan-graphene oxide composite membrane based on said first flake size or said second flake size of said graphene oxide.

15. The method of claim 1 further comprising the step of selectively controlling and/or adjusting a chemical speciation of said chitosan-graphene oxide composite membrane based on said first flake size or said second flake size of said graphene oxide.

16. The method of claim 1 further comprising the step of selectively controlling and/or adjusting a structure order of said chitosan-graphene oxide composite membrane based on said first flake size or said second flake size of said graphene oxide.

17. The method of claim 1 further comprising the step of selectively controlling and/or adjusting at least one membrane mechanical property of said chitosan-graphene oxide composite membrane based on said first flake size or said second flake size of said graphene oxide.

* * * * *